United States Patent [19]

Kazumi et al.

[11] Patent Number: 5,621,494

[45] Date of Patent: Apr. 15, 1997

[54] CAMERA HAVING LIGHT-SOURCE DETERMINING FUNCTION

[75] Inventors: Jiro Kazumi, Kanagawa-ken; Toru Nagata, Tokyo; Kenji Yokoyama, Kanagawa-ken, all of Japan

[73] Assignee: Canon Kabushiki Kaisha, Tokyo, Japan

[21] Appl. No.: 325,885

[22] Filed: Oct. 19, 1994

[30] Foreign Application Priority Data

Oct. 25, 1993 [JP] Japan .................. 5-287279
Oct. 25, 1993 [JP] Japan .................. 5-287281
Feb. 14, 1994 [JP] Japan .................. 6-037529

[51] Int. Cl.⁶ ................ G03B 13/36; G03B 15/05; G03B 15/00; G03B 17/24
[52] U.S. Cl. ................ 396/56; 396/159; 396/225

[58] Field of Search .................. 354/430, 416, 354/417, 402, 403, 266, 202; 348/211–214, 224–228, 349, 370

[56] References Cited

U.S. PATENT DOCUMENTS 4,998,162   3/1991   Kondo et al. .................. 348/224
5,016,039   5/1991   Sosa et al. ..................... 354/430

Primary Examiner—W. B. Perkey
Attorney, Agent, or Firm—Robin, Blecker, Daley & Driscoll

[57] ABSTRACT

The present invention relates to a camera having a light-source determining function for determining the kind of light source. According to the present invention, the light-source determining function of the camera is realized by using the output of a light receiving part of a remote control processing part of the camera.

9 Claims, 22 Drawing Sheets (INCANDESCENT LAMP)

(FLUORESCENT LAMP)

(INVERTER FLUORESCENT LAMP)

FIG.5(A)
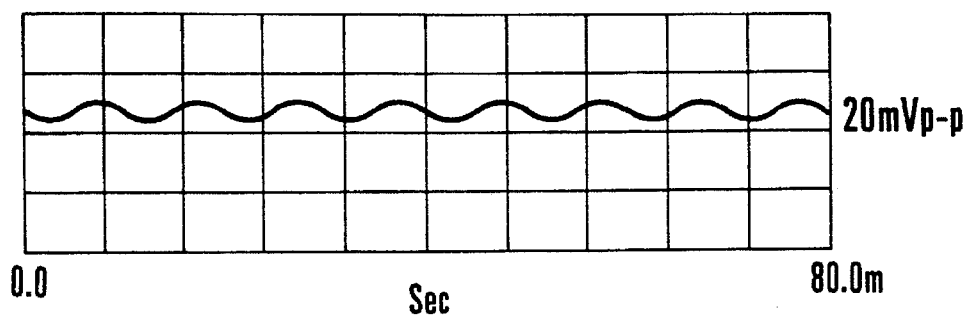
(INCANDESCENT LAMP)
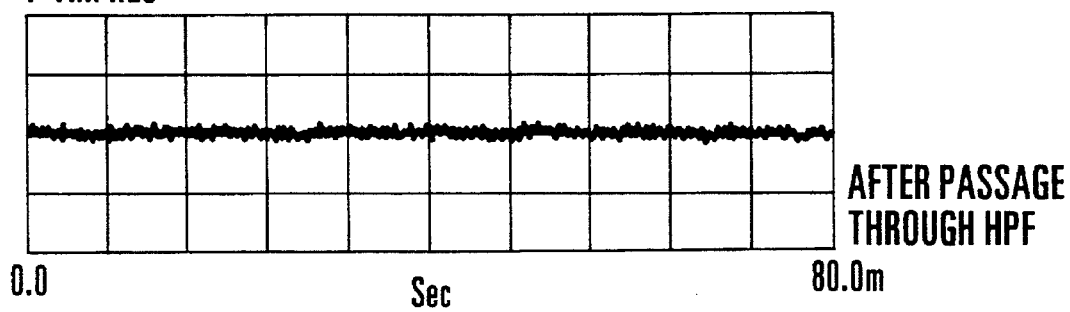
FIG.5(B)
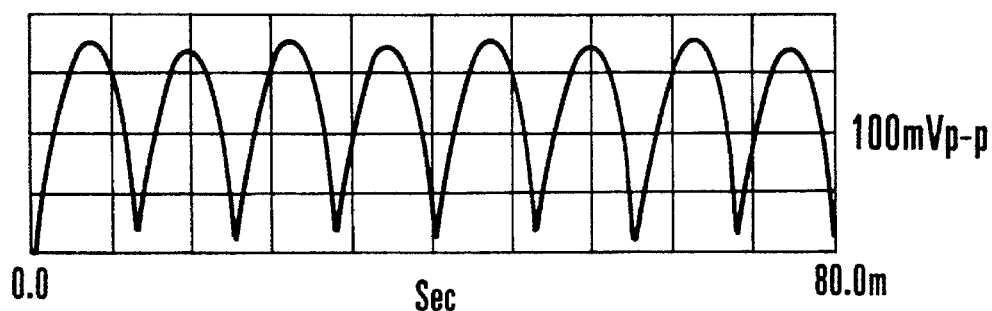
(FLUORESCENT LAMP)
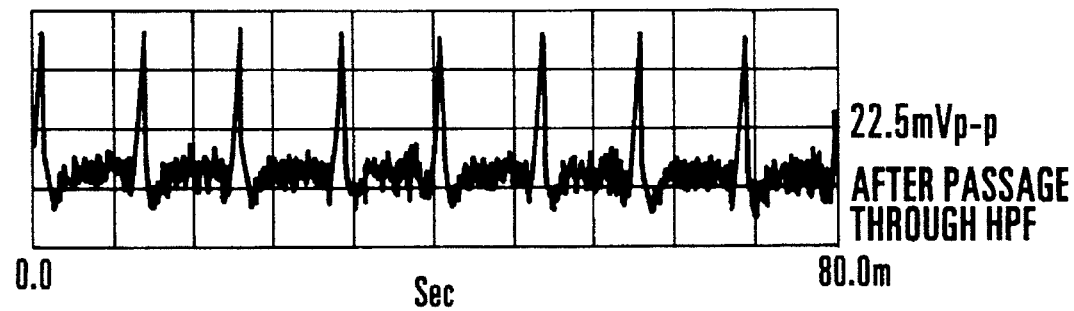

22mVp-p (INCANDESCENT LAMP)

100mVp-p (FLUORESCENT LAMP)

50mVp-p (INVERTER FLUORESCENT LAMP)

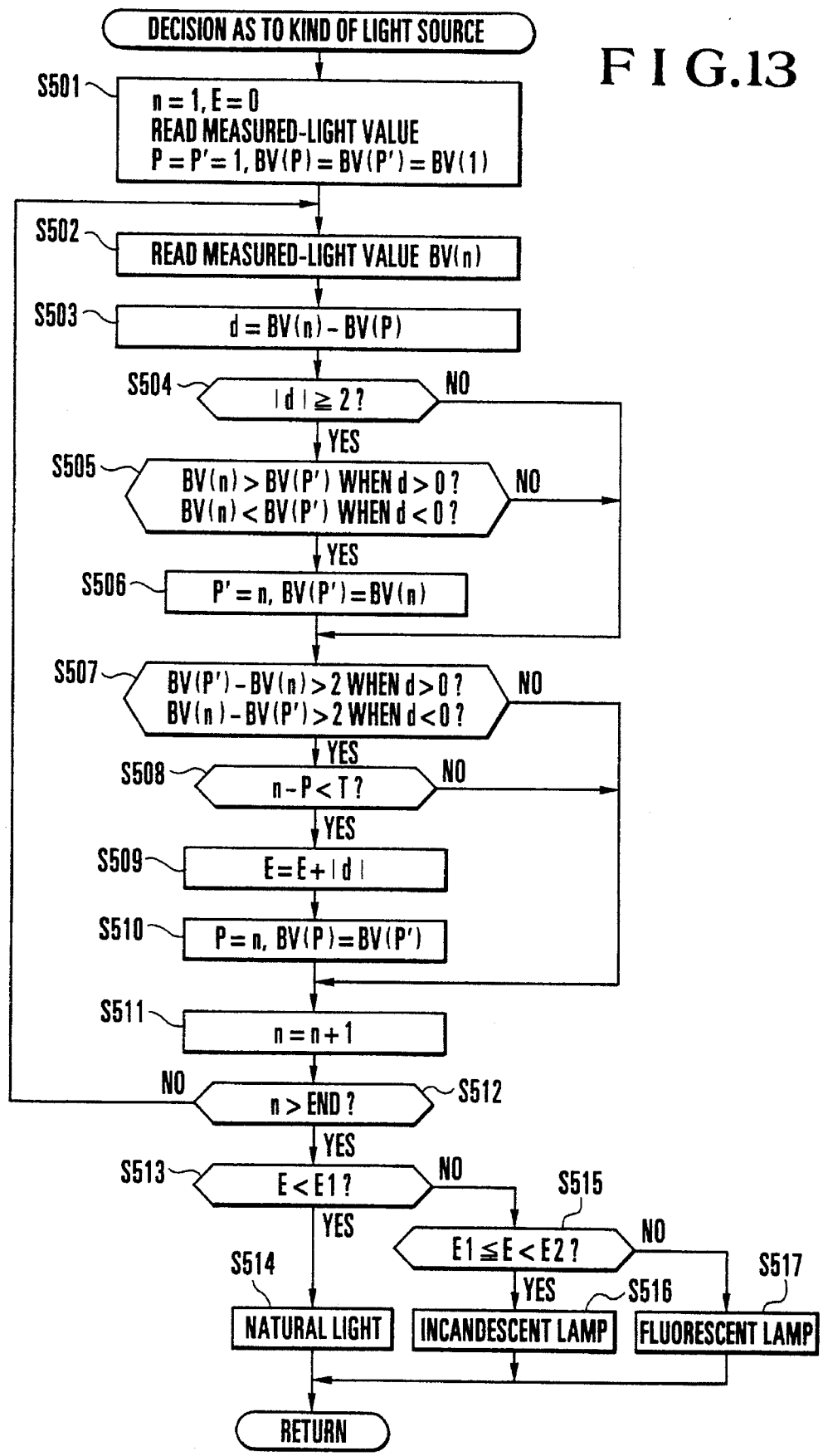
F I G. 13

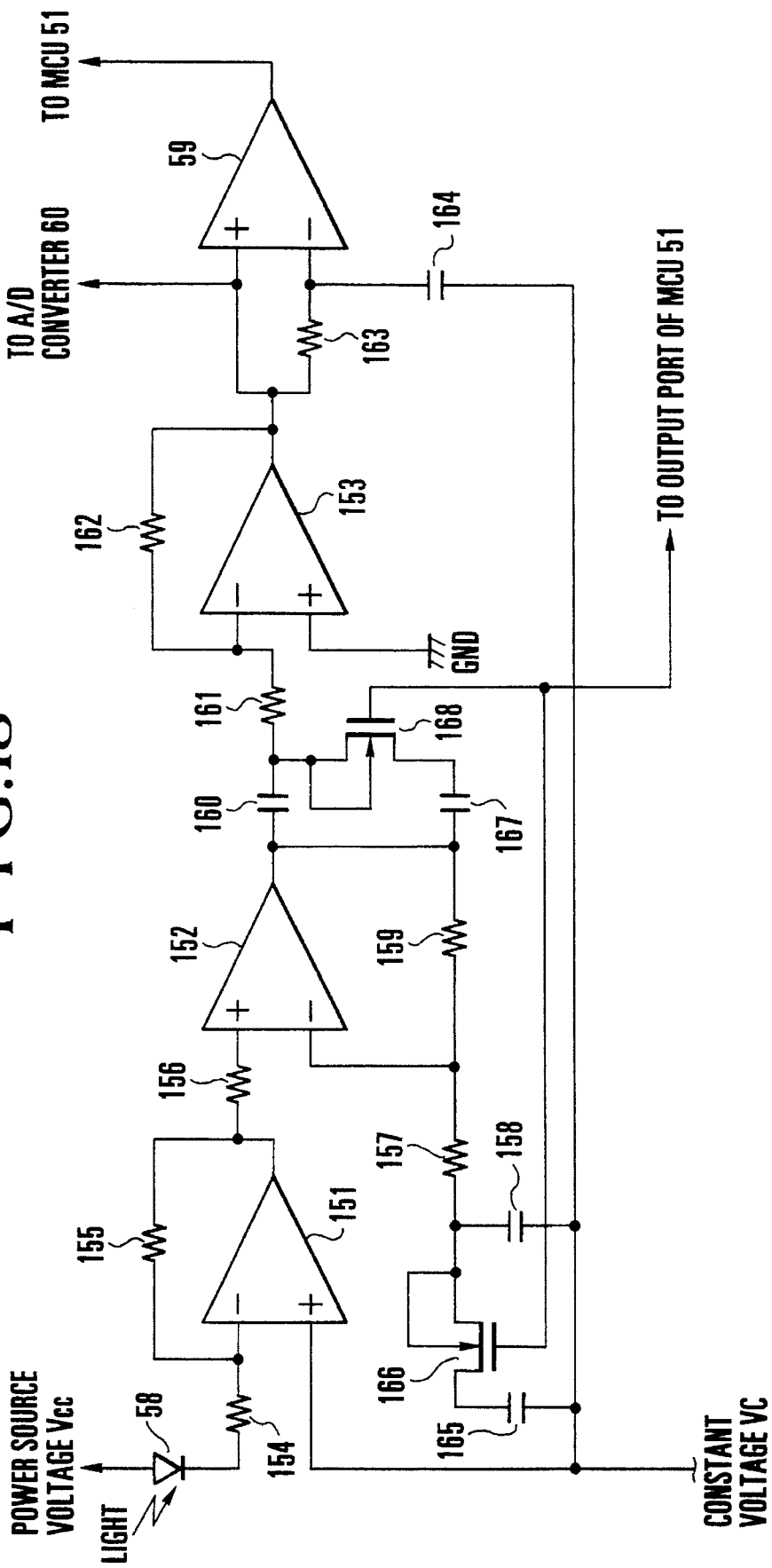
F I G. 18

FLUORESCENT LAMP

INCANDESCENT LAMP

INVERTER FLUORESCENT LAMP

WAVEFORMS DURING LIGHTING OF TWO FLUORESCENT LAMPS HAVING DIFFERENT PHASES

CAMERA HAVING LIGHT-SOURCE DETERMINING FUNCTION

BACKGROUND OF THE INVENTION

1. Field of the Invention

The present invention relates to an improvement of the light-source determining device of a camera for determining the kind of light source, such as an incandescent lamp, a fluorescent lamp or natural light, during photography.

2. Description of the Related Art

It has conventionally been common practice to incorporate a colorimetric sensor into a video camera (still movie camera) for the purpose of adjusting white balance. In the field of silver-halide cameras, Japanese Patent Publication No. Sho 58-53327 discloses the art of automating or simplifying the process of checking a negative film in a printing process, by using light-source decision information recorded on the negative film. Regarding a method for determining the kind of light source, an example using a color sensor is disclosed in Japanese Laid-Open Patent Application No. Hei 4-113339, or a proposal further having auxiliary means for detecting the flicker of a fluorescent lamp is also disclosed in U.S. Pat. No. 5,087,936.

In any of the conventional examples, a decision as to the kind of light source is made by using a color sensor made up of a plurality of sensors or by a combination of color detection and flicker detection.

However, the color sensor is comparatively expensive. The flicker detection is merely auxiliary means which makes a decision as to only a fluorescent lamp and needs to be used together with another means, thus leading to the problem that an expensive arrangement is needed.

As described above, the conventional methods of detecting the kind of light source are generally divided into two methods:

(a) a method of determining the kind of light source on the basis of the color of a light source; and (b) a method of determining the kind of light source on the basis of the temporal variation (flicker) of the brightness of a light source.

FIGS. 20(A) to 20(C) show variations in the brightness of different kinds of artificial light sources.

As shown in FIG. 20(A), a fluorescent lamp emits flicker at a frequency twice as higher as a commercial power source frequency, and exhibits a waveform which is similar to a waveform obtained by half-wave rectification of the alternating current of a power source. The ratio of a maximum value to a minimum value of the amount of light emitted from the fluorescent lamp is normally greater than or equal to two.

As shown in FIG. 20(C), a fluorescent lamp which performs an inverter type of high-frequency lighting emits flicker at high frequencies of 40–50 kHz. The waveform of this type of fluorescent lamp often contains far higher-frequency components. In many of this type of fluorescent lamp, the ratio of a maximum value to a minimum value of the amount of light is normally approximately two, similarly to the normal type of fluorescent lamp.

As shown in FIG. 20(B), an incandescent lamp (tungsten lamp) emits flicker having a sinusoidal waveform the frequency of which is approximately twice as high as the commercial power source frequency. The ratio of a maximum value to a minimum value of the amount of light is 1.1 to 1.2, smaller than that obtainable with the fluorescent lamp.

FIG. 21 shows another illumination example. In this illumination example, to reduce flicker, a plurality of fluorescent lamps are lit with their lighting waveforms out of phase with each other, and illumination is effected by the resultant amount of light.

Although the illumination example shown in FIG. 21 exhibits a flicker characteristic different from that of any of the above-descried examples shown in FIGS. 20(A) to 20(C), there is no large difference in light-source color between the example shown in FIG. 21 and the example shown in FIG. 20(A) or 20(C). For this reason, it is necessary to regard them as an identical light source in terms of color reproduction.

Since the conventional methods of detecting the kind of light source require a dedicated sensor and circuit, an increase in cost is incurred and a space in which to dispose such a sensor is needed.

In the method (b) of determining the kind of light source on the basis of flicker, the light measuring sensor of a camera may also be utilized. However, in a method of determining the presence or absence of flicker on the basis of the amount by which the amount of light varies, for example, the ratio of a maximum value and a minimum value of the amount of the variation, it is difficult to discriminate between flicker and a noise signal if the amount of flicker is small as shown in FIG. 21. In addition, as far as a simple variation is employed as a criterion for making a decision as to the presence or absence of flicker, if the luminance of a subject varies, the light measuring sensor of the camera which measures the luminance of the subject may erroneously determine that sunlight is a flickering light source.

The method of determining the kind of light source by using the light measuring sensor of the camera has a further problem. In general, the light measuring sensor of the camera is originally designed to measure steady light, and is not necessarily suited to detect flicker. Particularly in a light measuring sensor using the logarithmic compression circuit shown in FIG. 22, no sufficient output is obtained in a high-frequency range owing to a parasitic capacity, with the result that it is difficult to accurately detect flicker in the case of a high-frequency lighting fluorescent lamp. Such a circuit has the problem that, as indicated by the frequency-output characteristic shown in FIG. 23, a high-frequency output greatly lowers in the case of the lower-side curve representative of a low subject luminance and a small amount of light current.

SUMMARY OF THE INVENTION

An object of the present invention is, therefore, to provide a camera capable of accurately determining the kind of light source by means of a simple arrangement.

To achieve the above object, in accordance with one object of the present invention, there is provided a camera arranged to cause first and second comparing circuits to compare an output variation signal contained in the output of a light receiving sensor with their respective reference signals, and determine the kind of light source on the basis of the comparison results provided by the respective first and second comparing circuits.

To achieve the above object, in accordance with another aspect of the present invention, there is provided a camera in which an output signal contained in the output of a light receiving sensor is extracted by a first filter and the extracted signal is compared with a reference signal by a first comparing circuit, whereas a second filter extracts a further signal from the signal extracted by the first filter and the extracted signal is compared with a reference signal by a second comparing circuit, whereby the kind of light source is determined on the basis of the comparison results provided by the respective first and second comparing circuits.

In accordance with another aspect of the present invention, there is provided a camera or a light-source determining device which comprises output variation detecting means for repeatedly finding a maximum value or a minimum value of an output variation which occurs in light receiving means during a predetermined time period, as well as a time point at which the maximum value or the minimum value occurs, difference calculating means for finding a difference between a maximum value and a minimum value at adjacent time points found by the output variation detecting means, adding means for finding a sum of absolute values of differences found by the difference calculating means, and decision means for determining the kind of light source from the sum found by the adding means. If there is a significant variation in the output of existing light measuring means, the sum of the amount of the significant variation is obtained to determine the kind of light source.

In accordance with another aspect of the present invention, there is provided a camera or a light-source determining device which comprises amount-of-flicker calculating means for calculating the amount of flicker from the output of light measuring means, decision means for determining the kind of light source by comparing the amount of flicker obtained in the amount-of-flicker calculating means with a reference value, and reference value varying means for varying the reference value used by the decision means for determining the kind of light source, according to a subject luminance. The kind of light source is determined by comparing the amount of flicker obtained from the output of existing light measuring means with a predetermined reference value.

In accordance with another aspect of the present invention, there is provided a camera capable of accurately detecting a high-frequency lighting type of light source by using, as a light-source measuring sensor, a remote control sensor which is provided in the camera as a light-signal receiving sensor.

In accordance with another aspect of the present invention, there is provided a camera capable of accurately determining the kind of light source by using both a remote control sensor and a light measuring sensor.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 5(A) is a chart comparatively showing output waveforms which are obtained before and after a waveform signal obtained from an incandescent lamp is passed through the HPF shown in FIG. 2, and FIG. 5(B) is a chart similar to FIG. 5(A), but shows the case of an fluorescent lamp;

FIG. 13 is a flowchart showing the kind-of-light-source determining operation performed in the flowchart shown in FIG. 12;

FIG. 18 is a specific circuit diagram of a remote-control-signal receiving circuit according to another embodiment of the present invention;

DETAILED DESCRIPTION OF THE PREFERRED EMBODIMENTS

Preferred embodiments of the present invention will be described in detail below with reference to the accompanying drawings.

Figure 1:
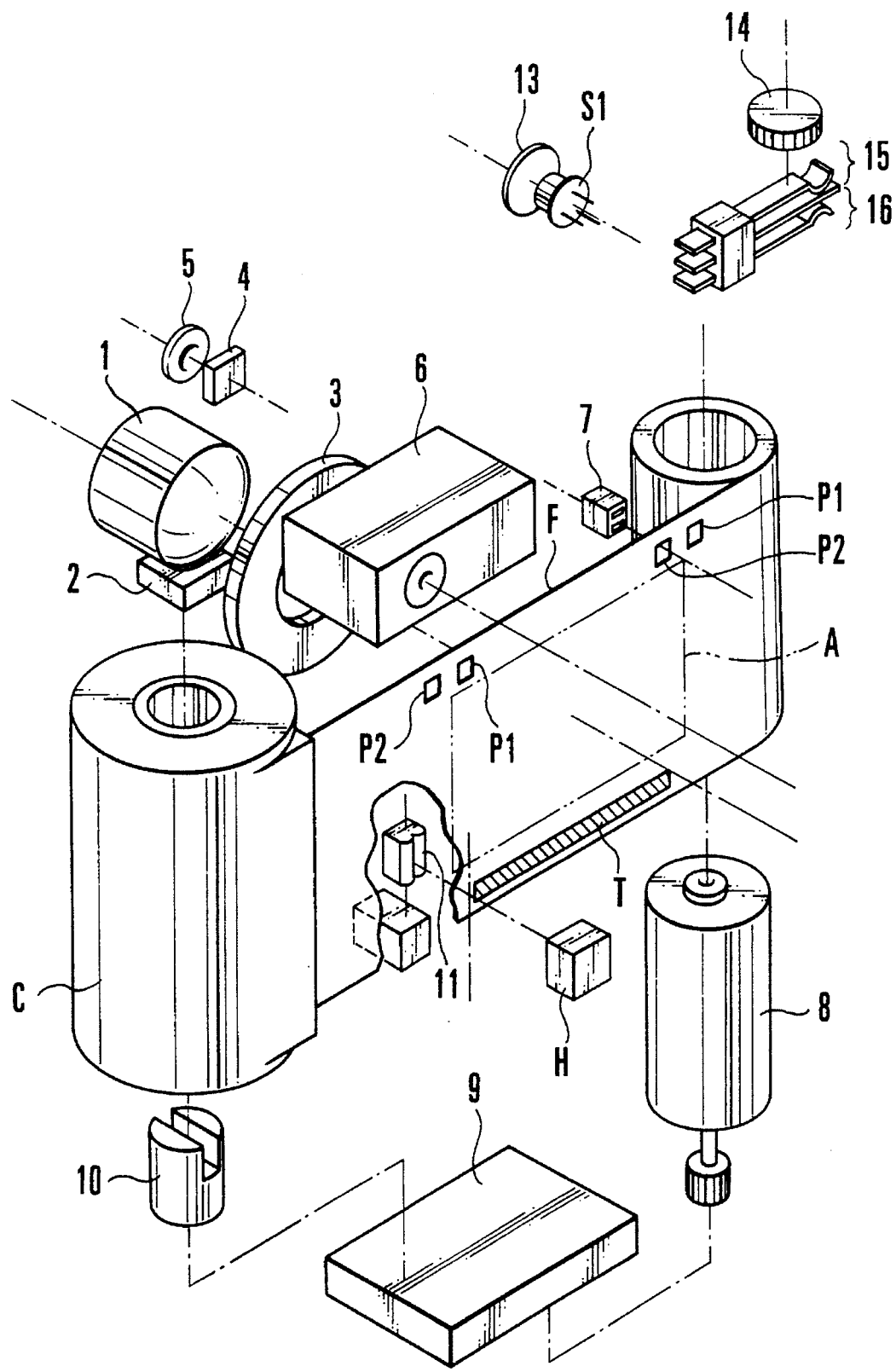
FIG. 1 is an exploded, perspective view diagrammatically showing the mechanical arrangement of a camera provided with a light-source determining device according to one embodiment of the present invention.
Figure 2:
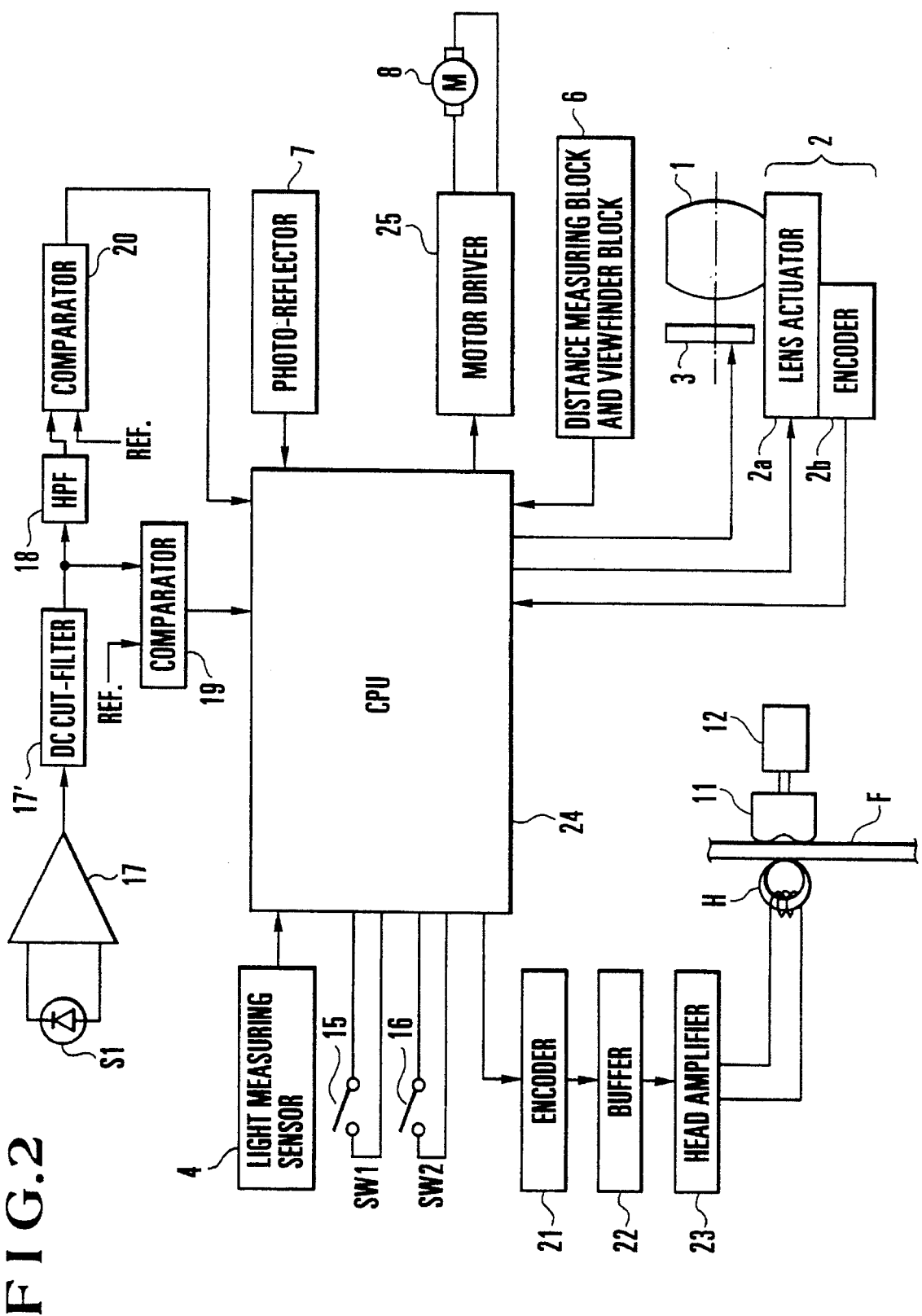
FIG. 2 is a block diagram showing the circuit arrangement of the camera shown in FIG. 1.

FIG. 1 is an exploded, perspective view diagrammatically showing the essential portion of the mechanical arrangement of a camera provided with a light-source determining device according to one embodiment of the present invention. FIG. 2 is a block diagram showing the essential portion of the circuit arrangement of the camera.

The camera shown in FIGS. 1 and 2 includes a photographic lens 1, a lens driving part 2 made up of a lens actuator 2a for driving the photographic lens 1 and an encoder 2b for generating a lens position signal, a lens shutter 3, a light measuring sensor 4 for automatic exposure adjustment (AE), a lens 5 for determining the light-receiving angle of the light measuring sensor 4, a block assembly 6 made up of a distance-measuring block and a viewfinder block, a photo-reflector 7 for detecting perforations P1 and P2 provided in a film F, which will be described later, and generating a pulse signal for use in transporting the film F by a regular amount, a film transporting motor 8 to be disposed in a spool, a gear train 9 for making a selection from among a speed reduction operation, a film winding operation and a film rewinding operation, and a rewinding fork 10.

A film cartridge C has the film F the base side of which is coated with a magnetic layer (track T), and the perforations P1 and P2 are provided in the film F in pairs in such a manner that each pair of perforations P1 and P2 is spaced from the adjacent pair of perforations P1 and P2 by a distance equivalent to the width of a photographic image plane A. A magnetic head H is provided for writing information to the track T on the film F. A pressure pad 11 is provided for pressing the film F against the magnetic head H, and a recess for increasing the tightness of contact between the film F and the magnetic gap of the magnetic head H is provided in the middle of the pressure pad 11. A pad pressing mechanism 12 is provided for pressing the pressure pad 11 against the magnetic head H at a predetermined pressure.

The shown camera also includes a light measuring sensor S1 for detecting a light source, a white diffusing plate 13 which cooperates with the light measuring sensor S1, a release button 14, a switch (SW1) 15 for activating a light measuring operation and a distance measuring operation, and a switch (SW2) 16 for starting the sequence of opening the lens shutter 3 and transporting the film F.

The shown camera also includes a head amplifier 17 for the light measuring sensor S1, a DC cut-filter 17', a high-pass filter (HPF) 18, a first comparator 19, a second comparator 20, an encoder 21, a buffer 22, a head amplifier 23 for the magnetic head H, a CPU 24 for controlling each individual circuit, and a motor driver 25 for driving the film transporting motor 8.

The operational sequence of the camera will be described below.

If the film cartridge C is loaded into the camera, the camera winds the film F up to the first frame. Then, if the switch SW1 is turned on, a distance measuring operation, a light measuring operation and a light-source determining operation are carried out, so that the CPU 24 processes information obtained from each of these operations and brings the camera into the state of waiting for an exposure operation. Each of the signals processed by the CPU 24 is converted into coded information by the encoder 21, and the coded information is stored in the buffer 22.

Then, if the switch SW2 is turned on, the lens driving part 2 (the lens actuator 2a and the encoder 2b for detecting a lens position) outputs a lens position signal to the CPU 24, and simultaneously performs the focusing operation of driving, positioning and stopping the photographic lens 1, until a stop instruction is issued from the CPU 24.

After that, the lens shutter 3 is opened for a time period determined according to the output of the light measuring sensor 4, and the film F is wound by one frame (until it is detected that the film F has been wound by the regular amount). At this time, the coded information on a light source is written from the buffer 22 to the magnetic head H through the head amplifier 23, and the coded light-source information is written to the track T on the film F.

When the above-described operation is performed on a prescribed frame, film rewinding is performed for the time period required to store the whole of the film F into the film cartridge C.

The outline of the sequence of a series of operations performed on a single film cartridge is as described above.

Figure 3:
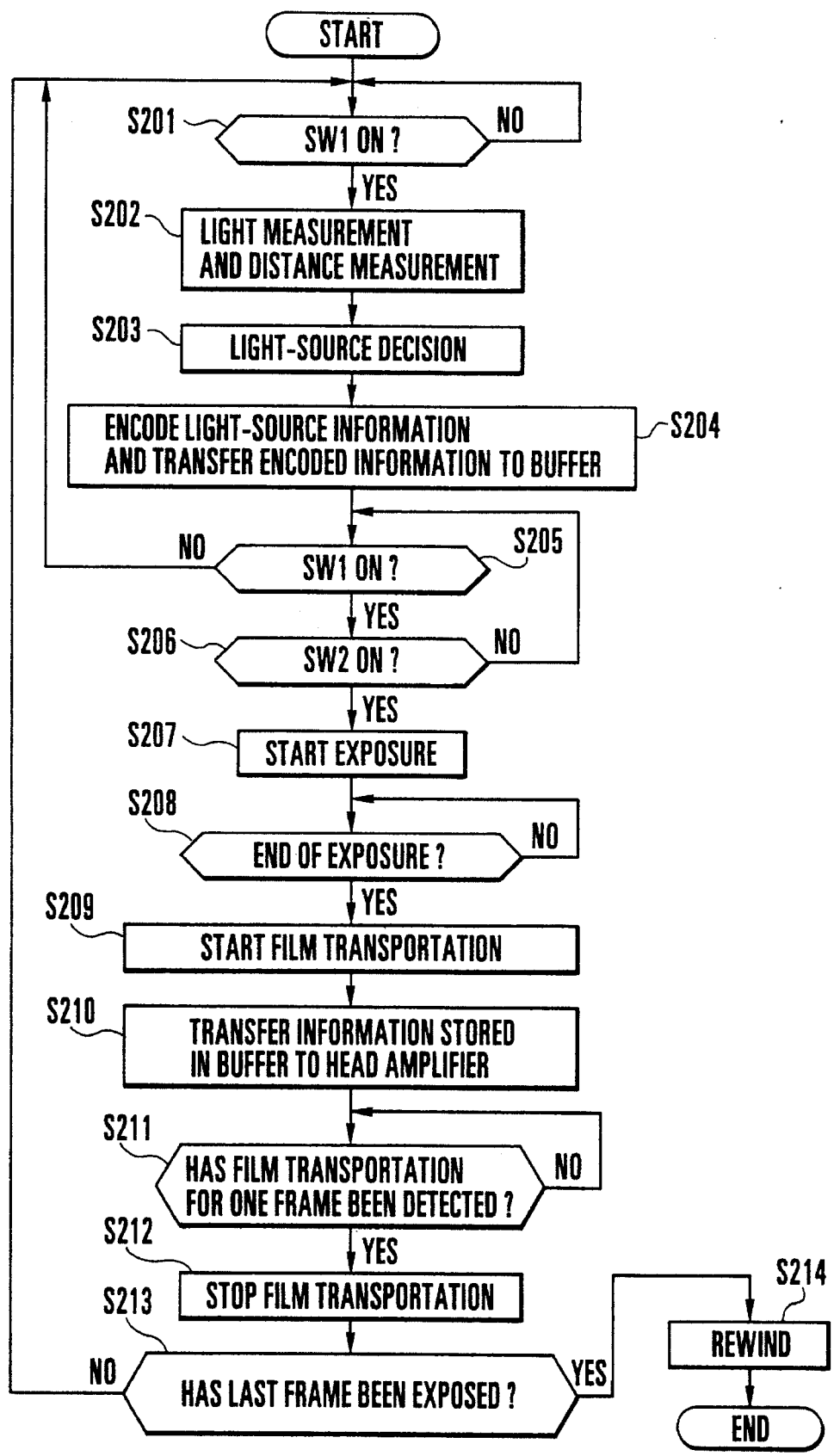
FIG. 3 is a flowchart showing the main operation of the camera shown in FIG. 1.

The operation of the above-described camera will be described below with reference to the flowchart of FIG. 3.

[Step S201] The state of the switch SW1 is checked. If the switch SW1 is on, the process proceeds to Step S202.

[Step S202] A light measuring operation and a distance measuring operation are performed, and the luminance of and the distance to a subject are calculated. Then, the photographic lens 1 is driven via the lens driving part 2 on the basis of the result of the distance measuring operation.

[Step S203] A decision is made as to the kind of light source for photography as will be described later in detail, and the result of this decision (daylight, fluorescent light or incandescent light) is stored.

[Step S204] The result of the decision which has been made as to the kind of light source in Step S203 is converted into a digital code by the encoder 21 and stored in the buffer 22 so that the result of such decision can be written to the track T on the film F.

At this time, information indicative of the luminance of and the distance to the subject which have been calculated in Step S202 is coded and stored in a similar manner. The coded information stored in the buffer 22 is held therein until it is updated with a new content.

[Step S205] The state of the switch SW1 is again checked. If the state of the switch SW1 is on, the process to Step S206, while if the state of the switch SW1 is off, the process returns to Step S201.

[Step S206] The state of the switch SW2 is checked. If the switch SW2 is on, the process proceeds to Step S207, while if the switch SW2 is off, the process returns to Step S205.

[Step S207] Since the switch SW2 is on, the shutter 3 is opened for a time period based on the aforesaid luminance of the subject, and the operation of exposing the film F is started.

[Step S208] The process waits for a shutter time determined on the basis of the coded information indicative of the luminance of the subject. When the shutter time elapses, the lens shutter 3 is closed to complete the exposure operation.

[Step S209] Film transportation is started.

[Step S210] The coded information stored in the buffer 22 is transferred to the head amplifier 23 in a time-series manner, and is recorded on the track T of the film F by the magnetic head H.

[Step S211] The process waits until the film F is transported by one frame. When it is detected that the film F has been transported by one frame, the process proceeds to Step S212.

[Step S212] The transportation of the film F is stopped.

[Step S213] It is checked whether exposure up to the last frame (or prescribed frame) has been completed. If exposure up to the last frame (or prescribed frame) has not yet been completed, the process return to Step S201. If such exposure has been completed, the process proceeds to Step S214.

[Step S214] Rewinding of the film F is performed.

The manner of making a decision as to the kind of light source for photography will be described below in detail.

Such a decision itself is made by the CPU 24. The characteristic of a light source the kind of which is to be determined is detected by the light-measuring sensor S1, the head amplifier 17, the DC cut-filter 17', the HPF 18 and the two comparators 19 and 20.

First of all, the operation of the HPF 18 will be described with reference to FIGS. 4(A) to 4(C).

Figure 4A:
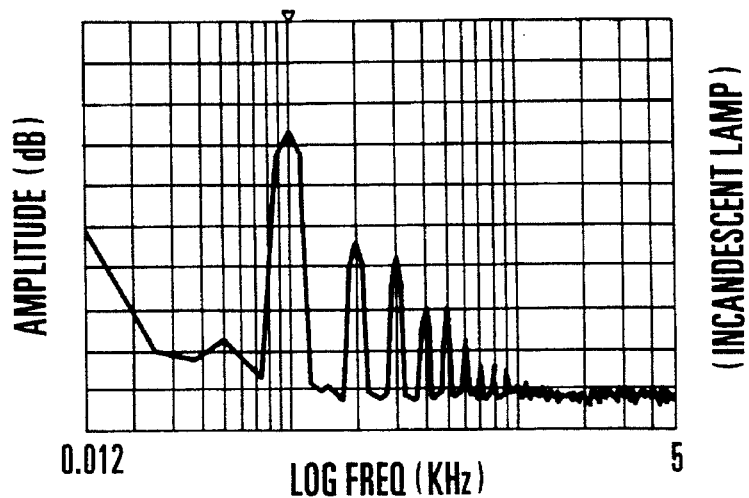
FIGS. 4(A), 4(B) and 4(C) are charts respectively showing the general frequency characteristics of an incandescent lamp, a fluorescent lamp and an inverter fluorescent lamp.
Figure 4B:
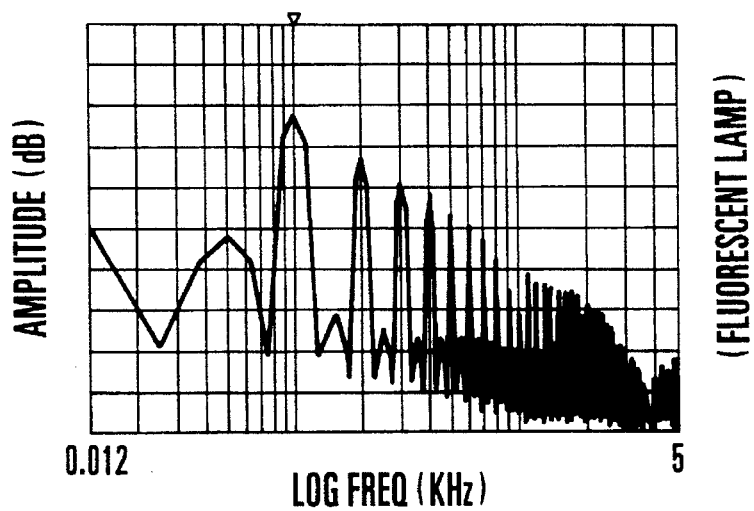
Figure 4C:
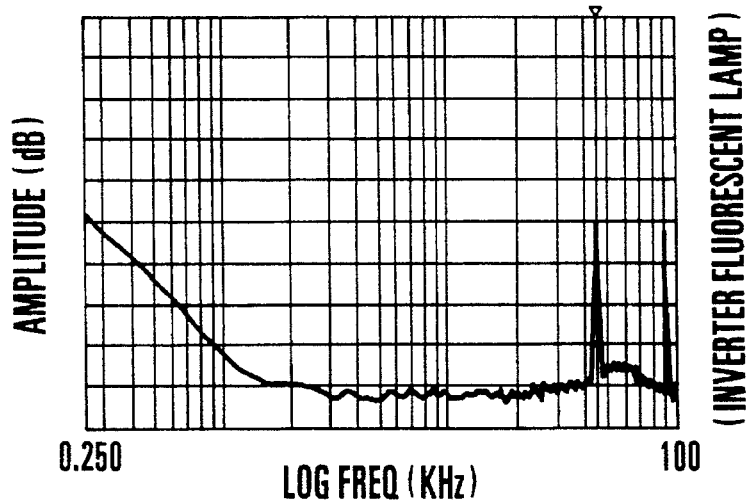

FIGS. 4(A) to 4(C) show different output waveforms of the head amplifier 17 in their frequency domains. FIG. 4(A) shows a measured value obtained when an incandescent lamp was used as a light source, FIG. 4(B) shows a measured value obtained when a normal fluorescent lamp was used as a light source, and FIG. 4(C) is a measured value obtained when an inverter fluorescent lamp was used as an inverter ballast type fluorescent lamp.

The fundamental frequencies of the output waveforms shown in FIGS. 4(A) and 4(B) are equal at 100 Hz which is twice a power-source frequency of 50 Hz, but the relative amounts of harmonic components with respect to the respective fundamental frequency components greatly differ.

In the case of the incandescent lamp shown in FIG. 4(A), the harmonic component sharply attenuates and a harmonic component of tenth order or higher is not observed. In the case of the fluorescent lamp shown in FIG. 4(B), large amounts of harmonic components are contained and even a harmonic component of twentieth order or higher can be clearly observed. In the case of the inverter fluorescent lamp shown in FIG. 4(C), the fundamental frequency itself is very high at 50 kHz. As is also known, natural light (=daylight) does not contain such an amplitude fluctuation.

FIGS. 5(A) and 5(B) show the relations between the above-described nature and the HPF 18.

The HPF 18 used in the above-described embodiment is a third-order high-pass filter having triple real poles at 300 Hz. FIG. 5(A) shows the output waveform of the head amplifier 17 obtained when the light source is the incandescent lamp, and the output waveform obtained by passing such an output waveform through the HPF 18, while FIG. 5(B) shows similar output waveforms obtained when the light source is the fluorescent lamp.

Because of the differences between the amounts of the higher-order frequency components shown in FIGS. 4(A) to 4(C), the output waveform of the HPF 18 obtained from the fluorescent lamp has an amplitude (refer to FIG. 5(B)), whereas the output waveform of the HPF 18 obtained from the incandescent lamp (refer to FIG. 5(A)) does not have a substantial amplitude. As described above, daylight originally has no such variation component, while the light of the inverter fluorescent lamp has the aforesaid very high fundamental frequency. Accordingly, the output waveform of the head amplifier 17 obtained from either of the daylight and the light of the inverter fluorescent lamp passes through the HPF 18 as is outputted from the head amplifier 17. It is, therefore, possible to discriminate among the kinds of light sources on the basis of only the amounts of variations of their respective AC components as shown at (1), (2), (3) and (4) in Table 1:

TABLE 1

|  | AC COMPONENT | | AFTER HPF | |
| --- | --- | --- | --- | --- |
| DAYLIGHT | X | (1) | X | |
| INCANESCENT LAMP (A) | O | (2) | X | (3) |
| FLUORESCENT LAMP (B) AND INVERTER FLUORESCENT LAMP | O | (2) | O | (4) |

O (there is a variation)
X (there is no variation)

To make a discrimination between (A) and (B), it is preferable to select a cut-off frequency as close to the fundamental frequency as possible by using a sharp filter. However, the sharp filter requires a multiplicity of element constants, such as C (capacitor) and R (resistor), and each of the element constants requires an extremely high precision. Such a sharp filter, therefore, is not suitable for use in a camera. However, according to this embodiment, by selecting a cutoff frequency of 300 Hz and making use of harmonics of third order or higher, it is possible to employ a simple, inexpensive filter.

For the above-described reasons, the reference voltage of the first comparator 19 is set to a reference voltage (for example, 10 mVp-p) which makes it possible to discriminate between daylight and the AC component of the light of an incandescent or fluorescent lamp, while the reference voltage of the second comparator 20 is set to a reference voltage (for example, 10 mVp-p) which makes it possible to discriminate between the light of an incandescent lamp and the light of a fluorescent lamp. In the value "10 mVp-p)", "p-p" indicates "peak to peak" (the amplitude of the AC component). Incidentally, the DC cut-filter 17' serves to cut a low-frequency signal component (substantially, a DC component) compared to the HPF 18.

Figure 6:
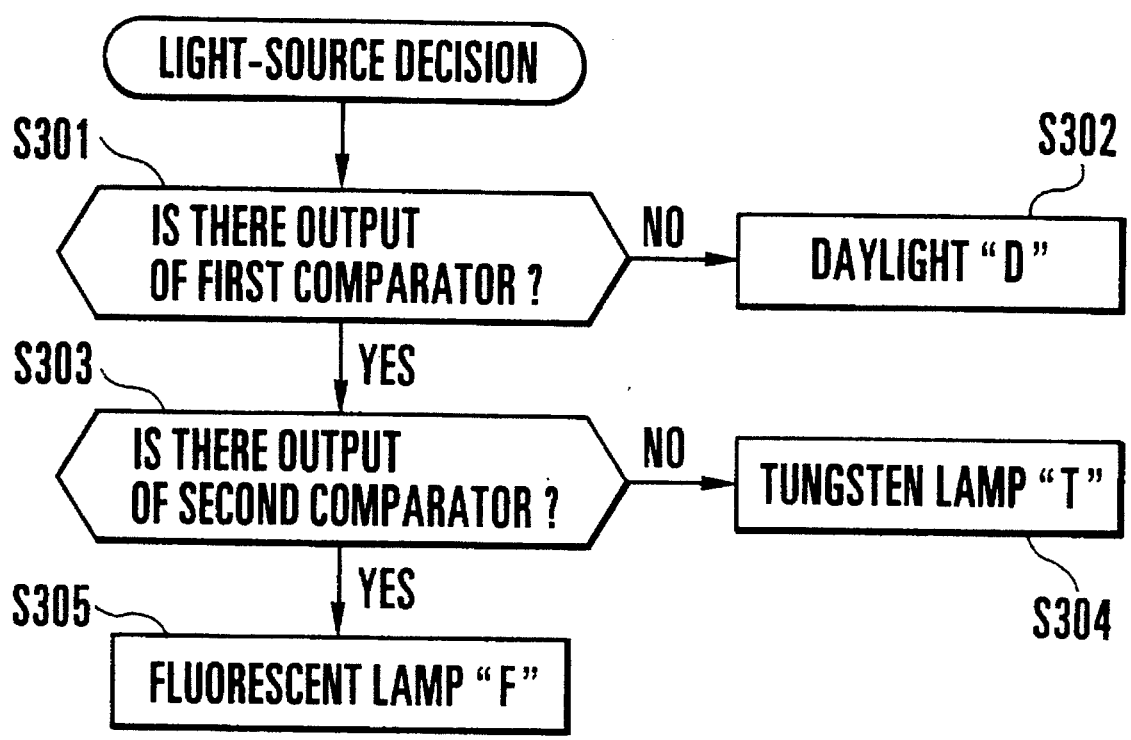
FIG. 6 is a flowchart showing in detail a light-source determining operation performed in the flowchart shown in FIG. 3.

An operation according to the decision shown in Table 1 will be described below with reference to the flowchart of FIG. 6.

[Step S301] It is determined whether there is an output of the first comparator 19. If there is no output, it is determined that the current status is (1) of Table 1, and the process proceeds to Step S302. If there is an output of the first comparator 19, it is determined whether the current status is (2) of Table 1, and the process proceeds to Step S303.

[Step S302] Since there is no output of the first comparator 19, information "D" indicative of daylight is transferred to the encoder 21.

[Step S303] It is determined whether there is an output of the second comparator 20. If there is no output, it is determined that the current status is (3) of Table 1, and the process proceeds to Step S304. If there is an output of the second comparator 20, it is determined that the current status is (4) of Table 1, and the process proceeds to Step S305.

[Step S304] Since there is no output of the second comparator 20, information "T" indicative of the light of an incandescent (tungsten) lamp is transferred to the encoder 21.

[Step S305] Since there is the output of the second comparator 20, information "F indicative of the light of a fluorescent lamp is transferred to the encoder 21.

Figure 7:
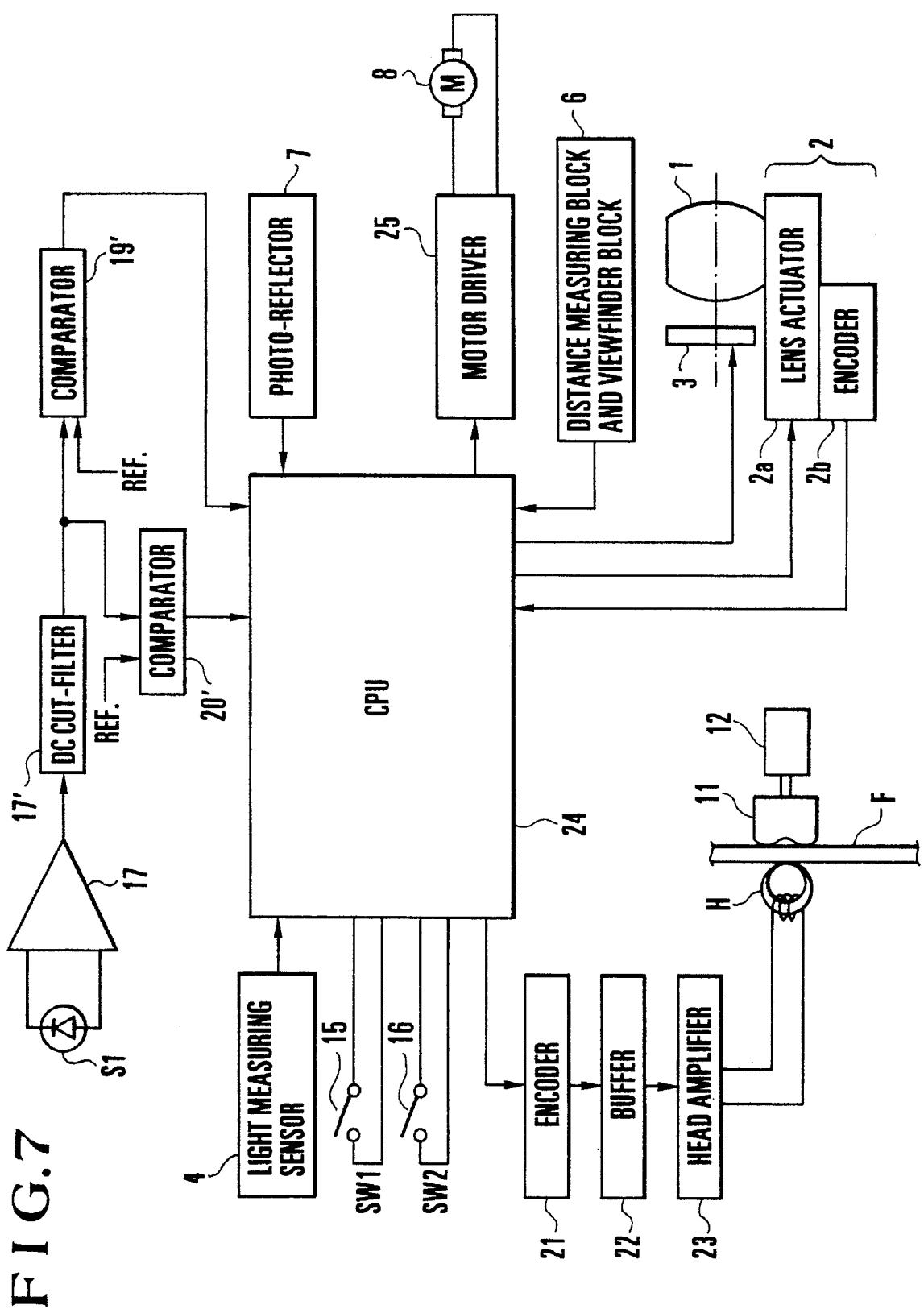
FIG. 7 is a block diagram showing the circuit arrangement of a camera provided with a light-source determining device according to another embodiment of the present invention.

FIG. 7 is a block diagram schematically showing the arrangement of the essential portion of a camera provided with a light-source determining device according to another embodiment of the present invention. In FIG. 7, identical reference numerals are used to denote elements identical to those shown in FIG. 2.

Referring to FIG. 7, a first comparator 19' is provided for comparing the amount of variation of the output of the light-measuring sensor S1 with a first reference voltage, and a second comparator 20' is provided for comparing the amount of variation of the output of the light-measuring sensor S1 with a second reference voltage.

Figure 8A:
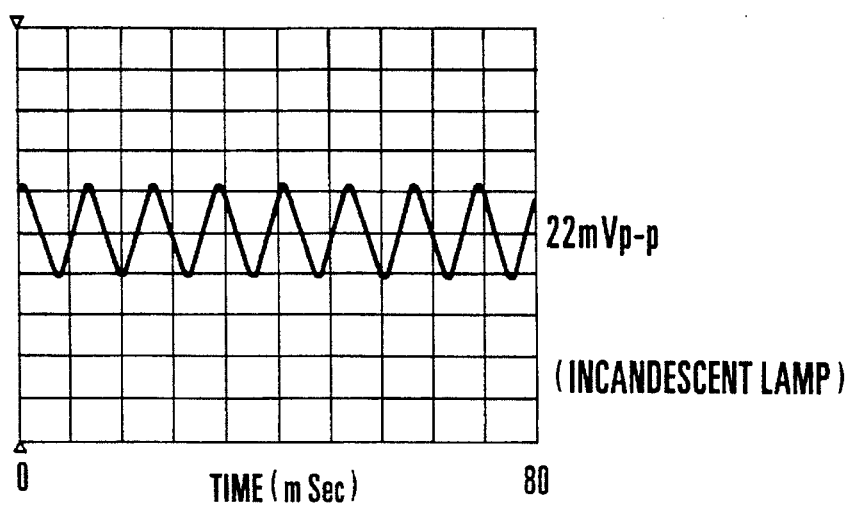
FIGS. 8(A), 8(B) and 8(C) are diagrams showing output waveforms which are respectively obtained through a head amplifier from an incandescent lamp, a fluorescent lamp and an inverter lamp.
Figure 8B:
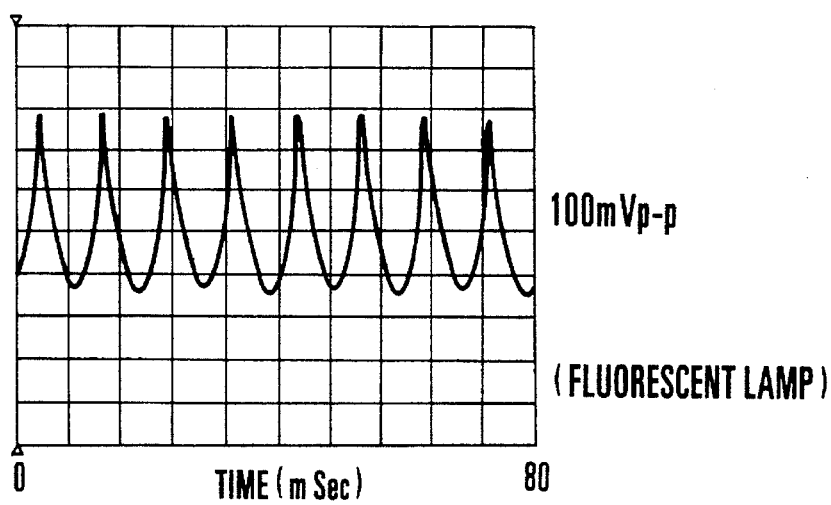
Figure 8C:
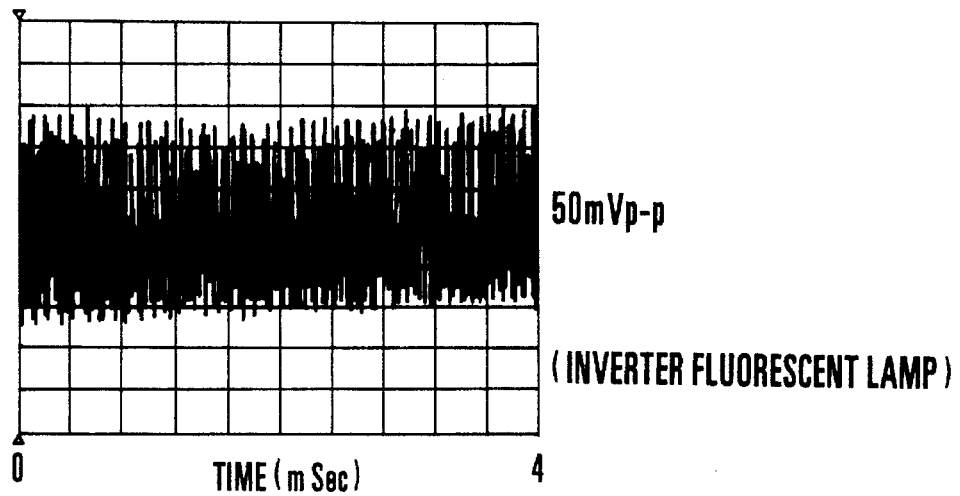

FIGS. 8(A), 8(B) and 8(C) show different output waveforms of the head amplifier 17 which are obtained from different light sources: an incandescent lamp, a normal fluorescent lamp and an inverter fluorescent lamp. If "0<first reference voltage (10 mVp-p)<variation of incandescent lamp<second reference voltage (40 mVp-p)<variation of fluorescent lamp" is set, the following relation is obtained:

TABLE 2

|  | GREATER THAN FIRST REFERENCE VOLTAGE | | GREATER THAN SECOND REFERENCE VOLTAGE | |
| --- | --- | --- | --- | --- |
| DAYLIGHT | X | (1) | X | |
| INCANDESCENT LAMP | O | (2) | X | (3) |
| FLUORESCENT LAMP | O | (2) | O | (4) |

O (there is a variation)
X (there is no variation)

Figure 9:
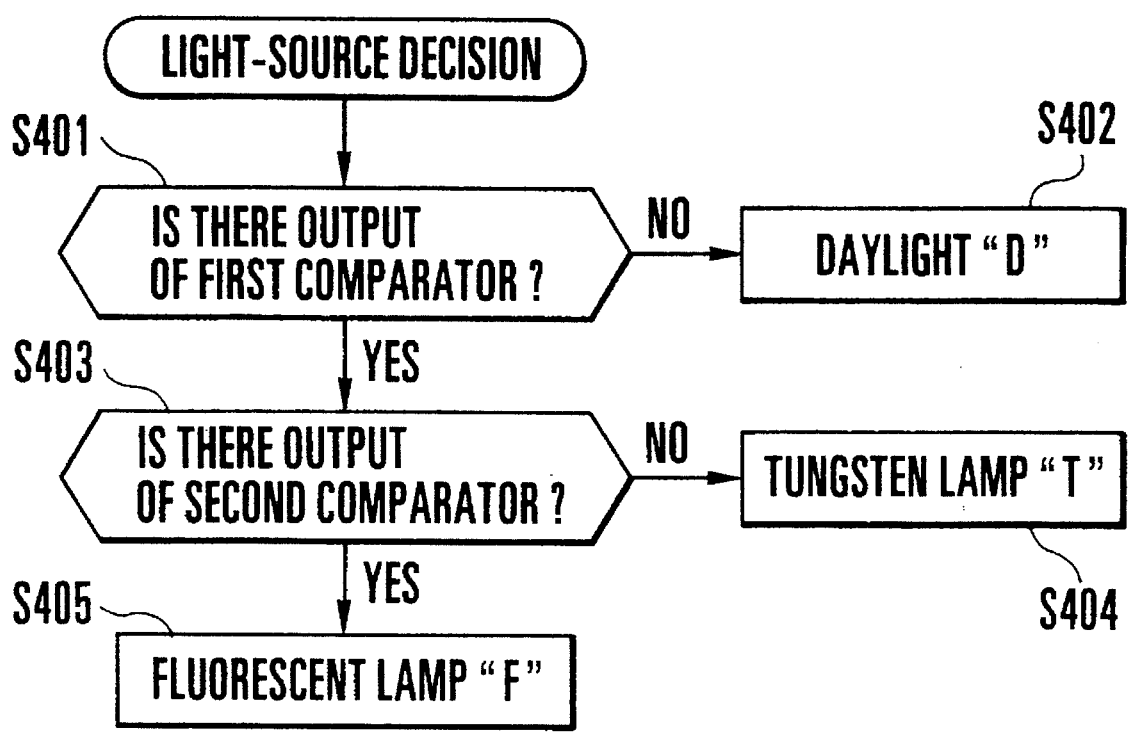
FIG. 9 is a flowchart showing in detail the light-source determining operation of the camera provided with the light-source determining device according to the embodiment, shown in FIG. 7, of the present invention.

An operation according to the decision shown in Table 2 will be described below with reference to the flowchart of FIG. 9. Since the main flowchart of the operation of the camera is similar to that shown in FIG. 3, the description thereof is omitted.

[Step S401] It is determined whether there is an output of the first comparator 19'. If there is no output, it is determined that the current status is (1) of Table 2, and the process proceeds to Step S402. If there is an output of the first comparator 19', it is determined whether the current status is (2) of Table 2, and the process proceeds to Step S403.

[Step S402] Since there is no output of the first comparator 19', information "D" indicative of daylight is transferred to the encoder 21.

[Step S403] It is determined whether there is an output of the second comparator 20'. If there is no output, it is determined that the current status is (3) of Table 2, and the process proceeds to Step S404. If there is an output of the second comparator 20', it is determined that the current status is (4) of Table 2, and the process proceeds to Step S405.

[Step S404] Since there is no output of the second comparator 20', information "T" indicative of the light of an incandescent (tungsten) lamp is transferred to the encoder 21.

[Step S405] Since there is the output of the second comparator 20', information "F indicative of the light of a fluorescent lamp is transferred to the encoder 21.

In accordance with each of the aforesaid embodiments, two comparators (the first and second comparators 19 and 20; 19' and 20') are employed to make a decision as to the amplitude of the output of light measuring means (the light-measuring sensor S1 and the head amplifier 17) for measuring the light of a light source, thereby determining the kind of light source. Accordingly, since the kind of light source can be determined by making only a decision as to amplitude, there is no need to use an expensive color sensor or to combine the decision as to flicker with another light-source determining means. Accordingly, it is possible to provide an inexpensive light-source determining device for a camera.

Figure 10:
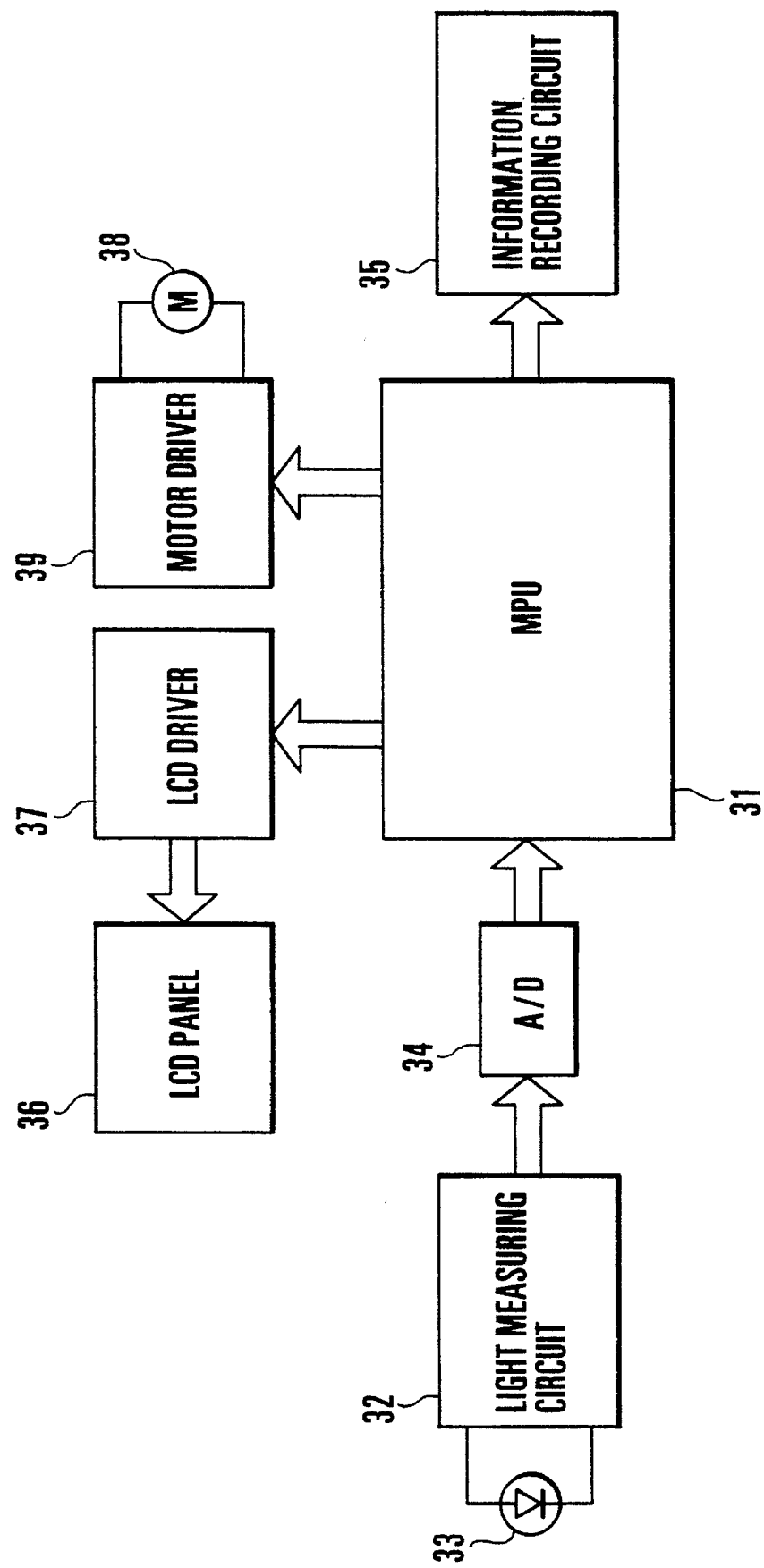
FIG. 10 is a block diagram schematically showing the arrangement of the essential portion of a camera provided with a light-source determining function according to another embodiment of the present invention.

FIG. 10 is a block diagram schematically showing the arrangement of the essential portion of a camera provided with a light-source determining function according to another embodiment of the present invention.

The arrangement shown in FIG. 10 includes a one-chip microcomputer (hereinafter referred to as the "MPU") 31 for controlling various operations of the camera. The MPU 31 is made up of a CPU for performing computing processing and a plurality of elements, such as a ROM having a written program, a RAM for storing data, an IO for inputting or outputting data to or from the outside, and a timer for measuring time, and these elements are connected to the CPU by data buses and address buses. A light measuring circuit 32 is arranged to amplify the output of a silicon photodiode (hereinafter referred to as the "SPD") 33 which is arranged to measure the luminance of a subject, and the output of the 32 is converted into a digital value by an A/D converter 34 which will be described later and the digital value is inputted to the MPU 31. The A/D converter 34 is arranged to convert the analog value outputted from the light measuring circuit 32 into an 8-bit digital value.

Further, in the arrangement shown in FIG. 10, an information recording circuit 35 is provided for writing information about a light source, and is arranged to be able to record information indicative of the kind of light source on a film. An LCD panel 36 is provided for providing visual display, and an LCD driver 37 is provided for driving the LCD panel 36. The LCD driver 37 is connected to an output port of the MPU 31, and is arranged to display information, such as the kind of light source, on the LCD panel 36 on the basis of data supplied from the MPU 31. A motor 38 is provided for transporting the film and a driver 39 is provided for driving the motor 38. The driver 39 is connected to another output port of the MPU 31 and is arranged to be controlled by a control signal outputted from the MPU 31.

Figure 11:
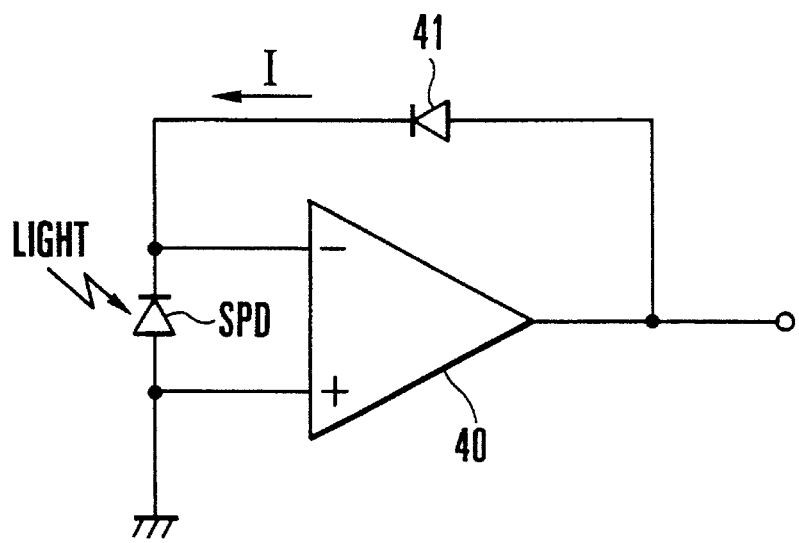
FIG. 11 is a circuit diagram showing the arrangement of the light measuring circuit shown in FIG. 10.

FIG. 11 is a circuit diagram showing a specific arrangement example of the light measuring circuit 32.

The light measuring circuit 32 is made up of an operational amplifier 40 and a diode 41 for logarithmic compression (the light measuring circuit 32 is arranged to serve as a logarithmic compression circuit) so that the amount of light can be detected with a wide dynamic range. The light measuring circuit 32 is arranged to logarithmically compress the amount of light inputted to the SPD 33 and output a voltage corresponding to the obtained value.

In this embodiment, computing processing suited to a waveform obtained from the variation of the amount of light of each individual light source is performed to accurately determine the kind of light source. The computing processing generally includes the steps of finding the sum of significant variations and determining the kind of light source on the basis of the sum.

The operation of the MPU 31 will be described below with reference to the flowchart of FIG. 12.

[Step S100] When a power source (not shown) of the camera is turned on and the camera is activated, it is determined whether a release button (not shown) of the camera has been manipulated. If the release button has been manipulated, the process proceeds to Step S104. If the release button has not been manipulated, the process proceeds to Step S101.

[Step S101] A signal passed through the SPD 33, the light measuring circuit 32 and the A/D converter 34 is read to measure the luminance of a subject. An aperture value and a shutter speed, which are control target values, are computed from the obtained information indicative of the luminance of the subject.

[Step S102] The signal read in Step S101 is computed to determine the kind of light source. The details of Step S102 will be described later with reference to the flowchart of FIG. 13.

[Step S103] The aperture value, the shutter speed and the kind of light source which have been obtained by the aforesaid computation are displayed on the LCD panel 36 via the LCD driver 37.

The MPU 31 repeats the above-described operation so far as the release button is not manipulated. After that, if the release button is manipulated, the MPU 31 causes the process to proceed from Step S100 to Step S104.

[Step S104] A release operation is performed in accordance with the aperture value and the shutter speed calculated in Step S101.

[Step S105] The kind of light source obtained in Step S102 is recorded on a surface of the film by the information recording circuit 35.

[Step S106] When the above-described operation is completed, the motor 38 is driven to transport the film. Then, the process returns to Step S100.

The computation performed in Step S102 for making a decision as to the kind of light source will be described below with reference to the flowchart of FIG. 13.

Figure 12:
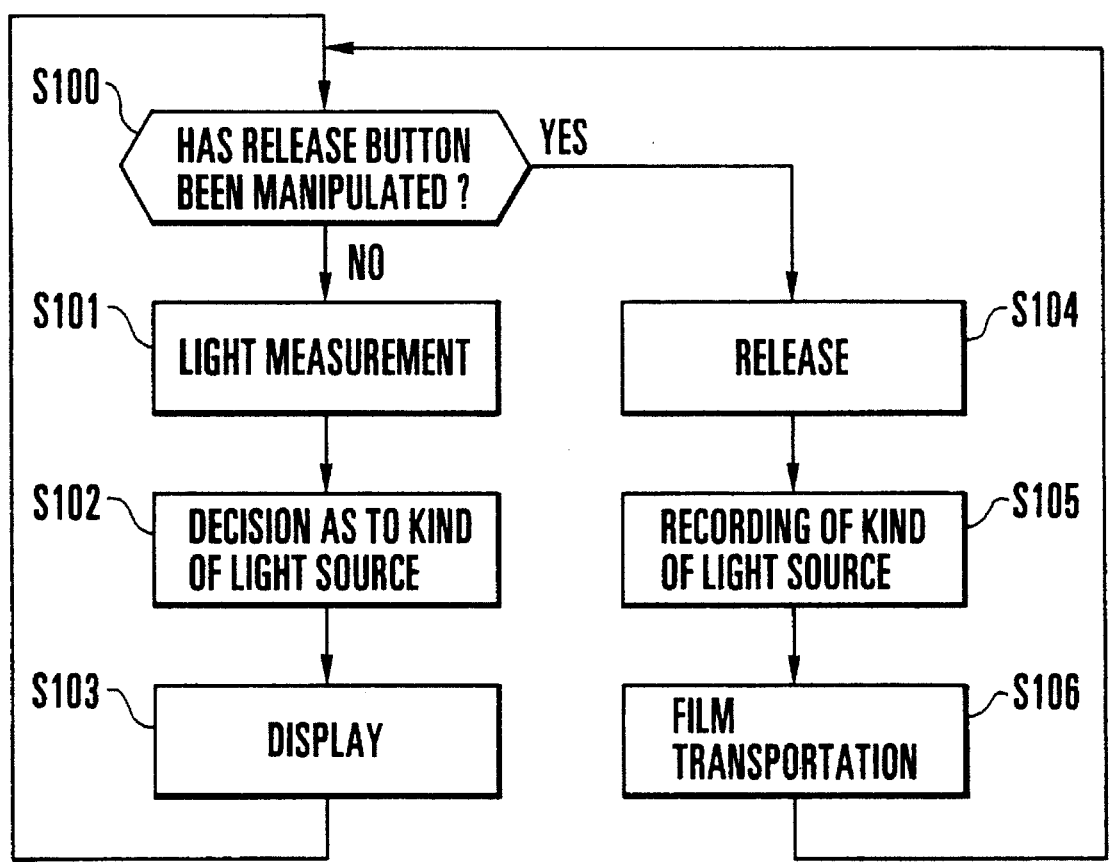
FIG. 12 is a flowchart showing the operation of the essential portion of the MPU shown in FIG. 10.

Incidentally, the light measurement of Step S101 of FIG. 12 is performed by a plurality of times at predetermined time intervals during a predetermined time period (in this example, ten milliseconds because the light measurement requires a time period longer than the period of a variation in the light of a light source). Individual measured-light values BV(n) (BV(n) represents a measured-light value obtained by one cycle of light measurement and is represented as an A/D-converted 8-bit 1-byte value) are recorded in a register as BV(1) to BV(END) (END represents a total number of times by which the measured-light value BV(n) is recorded). For example, BV(1) represents the first measured-light value, and BY(n) represents the n-th measured-light value.

[Step S501] Initial setting is performed. P represents the position of a point at which a change occurs in the direction in which the amount of light varies (the number of times of light measurements which are performed until the measured-light value reaches its transition value). P' represents the position of a representative point (the number of times of light measurements which are performed until a representative of the transition value is obtained). BV(P) represents a measured-light value (a local maximum or minimum value) obtained at the point at which a change occurs in the direction in which the amount of light varies. BV(P') represents the local maximum or minimum value which becomes a representative value. In the initial setting, the first measured-light value BV(1) is set as BV(P)=BV(P').

[Step S502] The measured-light value BV(n) is read. The measure-light value BV(1) is first read.

[Step S503] A difference "d" between the measured-light value BV(P) obtained at the point at which a change occurs in the direction in which the amount of light varies and the measured-light value BV(n) read in Step S502 is obtained. Since the first measured-light value is BV(1)=BV(P), the difference "d" is d=0.

[Step S504] It is determined whether the absolute value of the difference "d" obtained in Step S503 is greater than or equal to "2". If the difference "d" is greater than or equal to "2", i.e., if the amount of variation is large, the process proceeds to Step S505. Otherwise, i.e., if the difference (the amount of variation) between the measured-light value (BV(P)) at the transition point and the n-th measured-light value BY(n) is small, the process proceeds to Step S507.

[Step S505] It is determined whether the point at which the measured-light value BV(n) has been obtained becomes a representative point. If such a point is a representative point, the process proceeds to Step S506; otherwise, the process proceeds to Step S507.

A criterion for making such a decision is set as follows. If the amount of light is increasing (d>0), it is determined that the measured-light value BV(n) is greater than the measured-light value BV(P') obtained at the point which is selected as a representative point at that time. If the amount of light is decreasing (d<0), it is determined that the measured-light value BV(n) is smaller than the measured-light value BV(P').

[Step S506] Since there is a possibility that the point at which the measured-light value BV(n) has been obtained becomes a representative point at which the transition value can be obtained, the position of that point (how many times a light measuring operation has been performed until the measured-light value BV(n) is obtained) and the measured-light value are stored as n=P' and BV(n)=BV(P'), respectively.

[Step S507] It is determined whether the direction of the currently noted variation of the amount of light has changed to the opposite direction. If it is determined that such a change has occurred in the direction of the currently noted variation of the amount of light, the process proceeds to Step S508; otherwise, the process proceeds to Step S511.

A criterion for making such a decision is set as follows. If the amount of light is increasing (d>0), it is determined that the measured-light value BV(n) decreases by two or more with respect to the measured-light value BV(P') obtained at the point which is selected as a representative point at that time. If the amount of light is decreasing (d<0), it is determined that the measured-light value BV(n) increases by two or more with respect to the measured-light value BV(P').

[Step S508] Since it is determined that a change has occurred in the direction in which the amount of light varies, the difference in position between the point at which the change has occurred and the point at which the previous change was occurred (actually, the time period during which the amount of light varies) is checked. If such a difference is smaller than a predetermined reference value T, the process proceeds to Step S509, whereas if the difference is larger than the predetermined reference value T, the process proceeds to Step S511. The reference value T is preferably selected to be approximately half of the period during which the amount of light varies.

[Step S509] The amount of variation of the amount of light (=E+|d|) between the point at which the change has occurred in the direction in which the amount of light varies and the point which is selected as the representative point is employed as an evaluation value E for determining the kind of light source.

[Step S510] The point which has been selected as the representative point is stored as the point at which the change has occurred in the direction in which the amount of light has varied, and the process proceeds to Step S511.

[Step S511] A point at which to read a measured-light value is updated.

[Step S512] It is determined whether the relation of "n>END" is satisfied. If the relation of "n>END" is not satisfied, the process returns to Step S502 and similar processing is repeated, i.e., the above-described processing is performed on all the measured-light values. If the relation of "n>END" is satisfied, the process proceeds to Step S513.

In Steps S504 and S507, the variation of not less than "2" is regarded as an effective amount of variation. This is because small noise may be converted into a variation of one step when the A/D converter 34 digitizes a measured-light value. As a matter of course, in a case where a greater noise occurs in a measured-light value, it is necessary to use only the amount of variation greater than the amount of the noise as an effective value.

Figure 21:
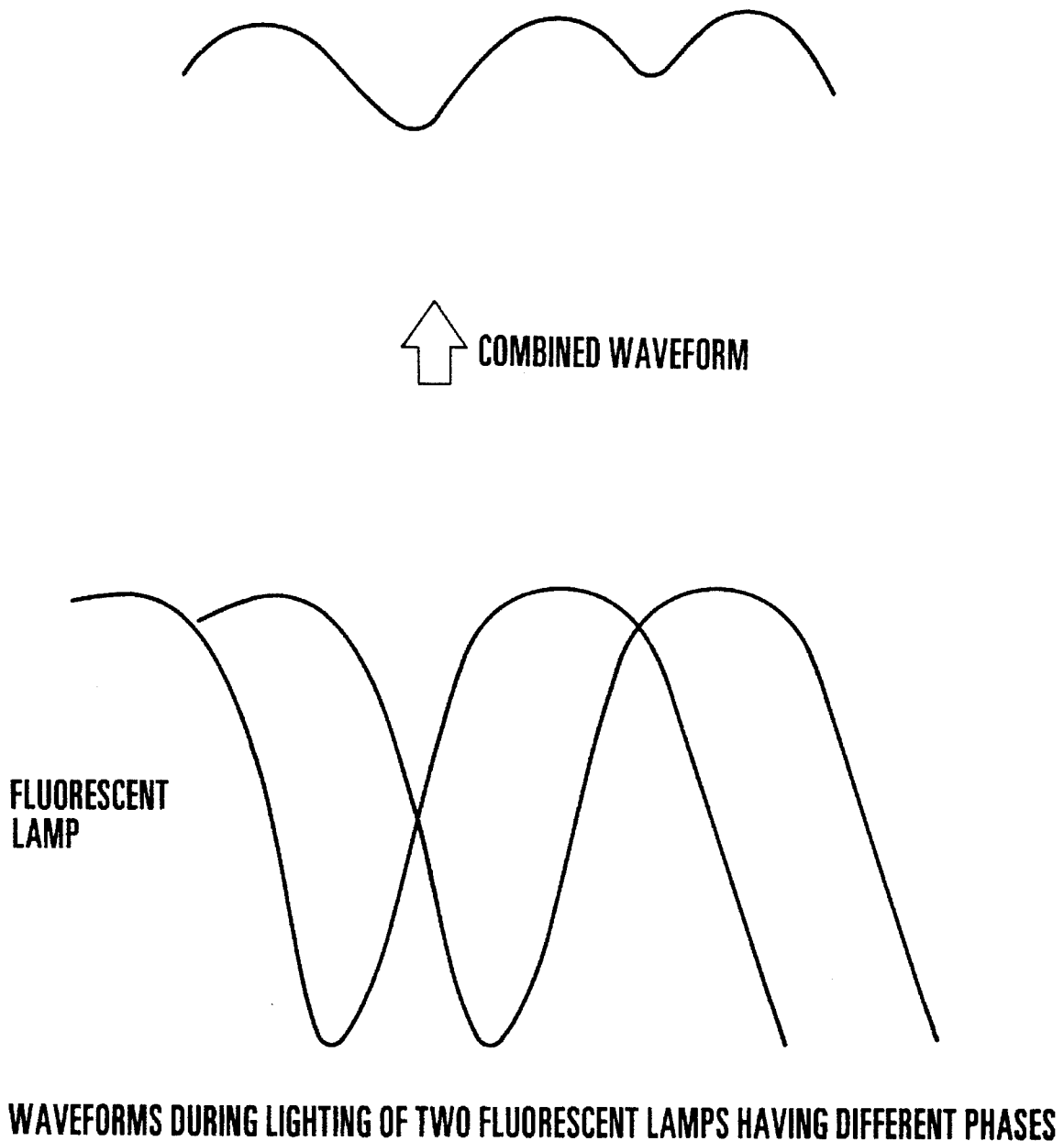
FIG. 21 is a view showing one illumination example in which a plurality of fluorescent lamps are lit with their lighting waveforms out of phase with each other and illumination is effected by the resultant amount of light.
Figure 22:
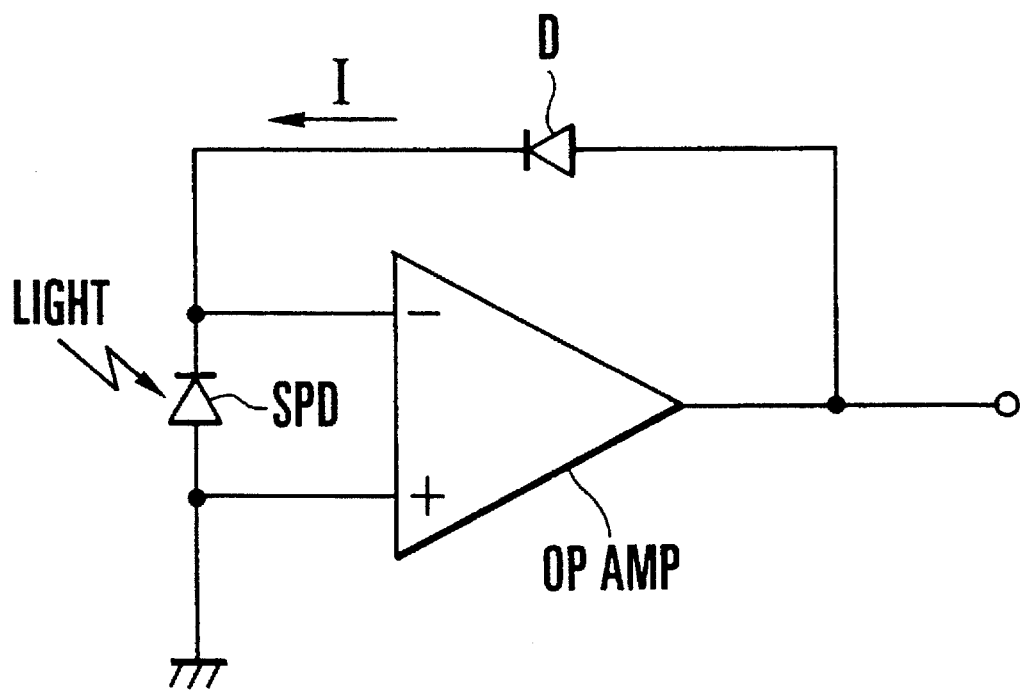
FIG. 22 is a circuit diagram showing the arrangement of a normal light measuring circuit.
Figure 23:
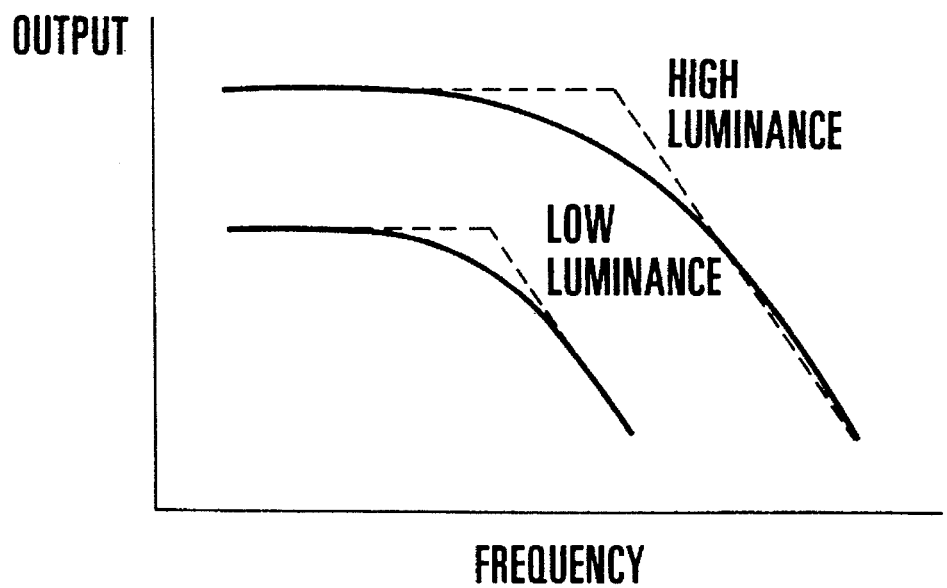
FIG. 23 is a graph showing the frequency-output characteristic of the light measuring circuit.

Through the above-described processing, the evaluation value E is obtained as the sum of the differences between the amounts of light measured at the respective points at which changes have occurred in the direction in which the amount of light varies. The evaluation value E is approximately proportional to the product of the amount of flicker and a flicker frequency in the case of a phenomenon which shows a periodical variation, such as flicker. Accordingly, even if the amount of flicker is small as shown in FIG. 21, the evaluation value E becomes larger as the period of each variation is shorter. In other words, the above-described processing provides the sum of peak-to-peak variations of a measured-light value which varies within a predetermined time period (a signal waveform).

Then, in Steps S513 to S517, the kind of light source is determined on the basis of the evaluation value E.

[Step S513] The evaluation value E obtained in Step S509 is compared with a first predetermined value E1. If the relation of "E<E1" is satisfied, the process proceeds to Step S514; otherwise, the process proceeds to Step S515.

[Step S514] Since the evaluation value E is less than the first predetermined value E1, it is determined that the light source is natural light such as sunlight.

[Step S515] The evaluation value E obtained in Step S509 is compared with the first predetermined value E1 and a second predetermined value E2. If the relation of "E1≦E<E2" is satisfied, the process proceeds to Step S516; otherwise, the process proceeds to Step S517.

[Step S516] Since the evaluation value E is not less than the first predetermined value E1 and less than the second predetermined value E2, it is determined that the light source is an incandescent lamp.

[Step S517] Since the relation of "E≧E2" is satisfied, it is determined that the light source is a fluorescent lamp.

When the above-described operation is completed, the process returns to the main routine shown in FIG. 12.

It is to be noted that although the above-described embodiment is arranged to determine the kind of light source by noting only the amount of flicker (evaluation value), it is also possible to determine the kind of light source by noting the luminance of a subject and the amount of flicker since a subject shows different luminances for different light sources.

Figure 24:
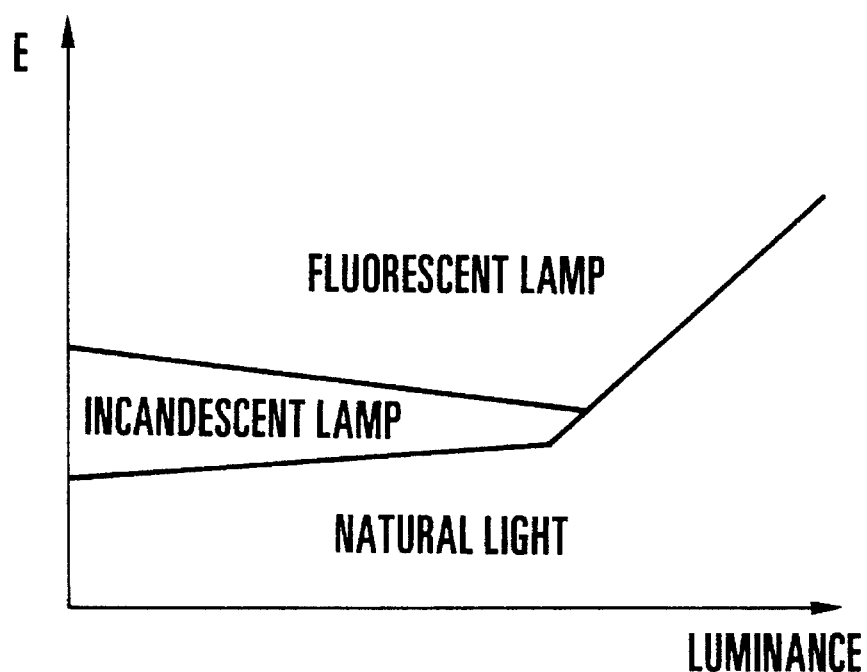
FIG. 24 is a graph showing the relation between a subject and the kinds of light sources.

If the amount of flicker is extremely large, it can be determined that the light source is a fluorescent lamp, irrespective of the luminance of a subject. In addition, the luminance of a subject illuminated with a tungsten light source (incandescent lamp) is normally not greater than a particular extent of brightness, whereas the luminance of a subject illuminated with sunlight is not less than a particular extent of brightness. Of course, there is a brightness level common to any illuminating light source. Accordingly, if the first predetermined value E1 and the second predetermined value E2 which are used for determining the kind of light source are made to vary as a function of the luminance of a subject as shown in FIG. 24, it is possible to determine the kind of light source more accurately.

According to the present embodiment, since a light measuring sensor and a light measuring circuit which are incorporated in a camera are utilized, it is not necessary to newly add a senor or circuit for determining the kind of light source. In a camera using a microcomputer, since a measured-light value is temporarily converted into a digital value for the purpose of processing, it is possible to use a light measuring circuit as an A/D converter.

In addition, since the sum of the amounts of variations is obtained while neglecting the amount of variation smaller than a noise level, it is possible to determine the kind of light source even in the case of a fluorescent lamp having a small amount of flicker.

As described above, if the luminance of a subject varies, the amount of light in many cases varies in a constant direction. In the present embodiment, if the direction in which the amount of light varies does not change for not less than a predetermined time period, this state is excluded from a decision criterion. Accordingly, it is possible to easily discriminate between the variation of the luminance of a subject and flicker.

In a case where the sum of the amounts of variations of the amount of light is used as a decision criterion, since a value to be used as the decision criterion is varied according to the luminance of a subject, it is possible to determine the kind of light source more accurately.

Figure 14:
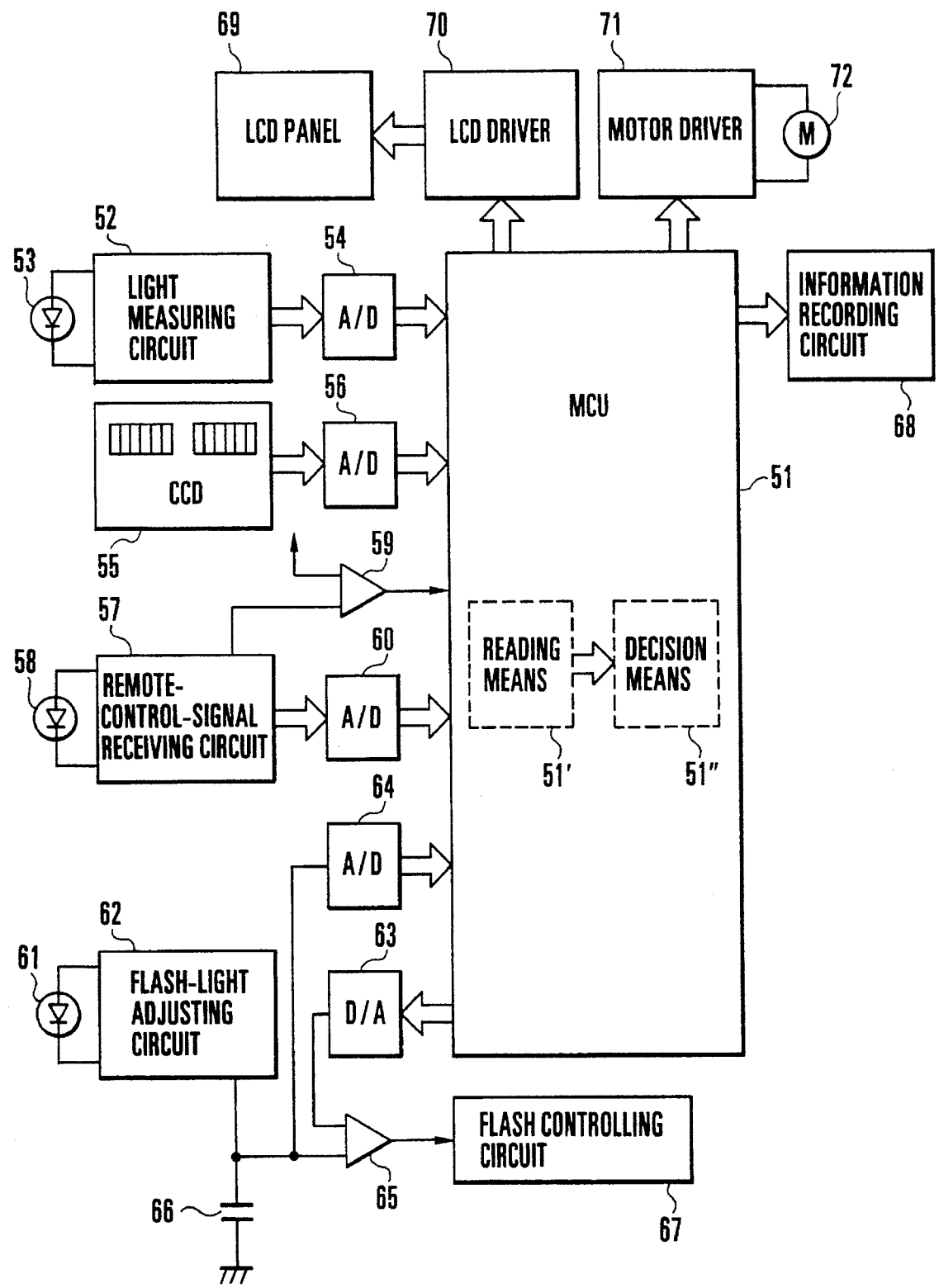
FIG. 14 is a block diagram showing a camera provided with a light-source determining function according to another embodiment of the present invention.

FIG. 14 is a block diagram showing a camera provided with a light-source determining function according to still another embodiment of the present invention.

The camera according to the embodiment shown in FIG. 14 includes a one-chip microcomputer (hereinafter referred to as the "MCU") 51 which serves as a control circuit for controlling the camera. The MCU 51 is made up of a CPU for performing computing processing and a plurality of elements, such as a ROM having a program written therein, a RAM for storing data, an IO for inputting or outputting data to or from the outside, and a timer for measuring time, and these elements are connected to the CPU by data buses and address buses. The MCU 51 has reading means 51' for reading a sensor output on the basis of a light-source determining algorithm, and decision means 51" for determining the kind of light source from the value of the sensor output read by the reading means 51', on the basis of the light-source determining algorithm.

Outside of the MCU 51, there is provided a light measuring sensor system which is formed by a light measuring circuit 52 for amplifying the output of a light measuring sensor 53 for measuring the luminance of a subject and providing an output corresponding to the value of the amount of incident light, and an A/D converter 54 for converting the output of the light measuring circuit 52 into a digital value and inputting the digital value to the MCU 51 (including the reading means 51').

An AF system is formed by an optical-signal accumulating sensor, i.e, a CCD 55, which serves as a distance-measuring (focus-detecting) light receiving sensor which is arranged so that an image corresponding to the amount of defocusing of a lens can be formed on a pair of line sensors by an optical system (not shown), and an A/D converter 56 for converting the output of the CCD 55 into a digital value and inputting the digital value to the MCU 51 (including the reading means 51').

A pin photo-diode 58 which serves as a light receiving element for receiving a remote control signal, i.e., receiving a light signal from a remote-control-signal transmitter which is located in the outside, is connected to a remote-control-signal receiving circuit 57, and the output of the remote-control-signal receiving circuit 57 is connected to an input port of the MCU 51 via a comparator 59. A sensor system (sensor means) for remote control is formed by the pin photo-diode 58 and an A/D converter 60 for converting the output of the remote-control-signal receiving circuit 57 into a digital signal and inputting the digital signal to the MCU 51 (including the reading means 51').

A photo-diode 61 which serves as a light receiving element for adjusting flash light is connected to a flash-light adjusting circuit 62, and light reflected from a film surface is made incident on the photo-diode 61 when a shutter release operation is performed. The flash-light adjusting circuit 62 amplifies the incident-light signal and stores the amplified signal in a capacitor 66, whereby charge corresponding to the amount of the incident light is stored in the capacitor 66. A comparator 65 compares the voltage of the capacitor 66 with the output of a D/A converter 63 for performing D/A conversion of a control signal outputted from the MCU 51, and when the voltage of the capacitor 66 reaches a predetermined value, a flash controlling circuit 67 stops the emission of a flash tube (not shown). A flash-light adjusting sensor system is formed by the above-described elements and an A/D converter 64 for converting the voltage of the capacitor 66 into a digital signal and inputting the digital signal to the MCU 51 (including the reading means 51').

An information recording circuit 68 records information indicative of the kind of light source on the film on the basis of a light-source information signal outputted from the MCU 51, the light-source information signal being indicative of the result of a decision made by decision means 51" in the MCU 51. An LCD driver 70 constitutes a display circuit together with an LCD panel 69. The LCD driver 70 is connected to the MCU 51 and receives data from the MCU 51 to drive the LCD panel 69 to provide a visual display. A motor driver 71 is connected to the MCU 51, and receives a control signal from the MCU 51 to drive a film transporting motor 72.

Figure 15:
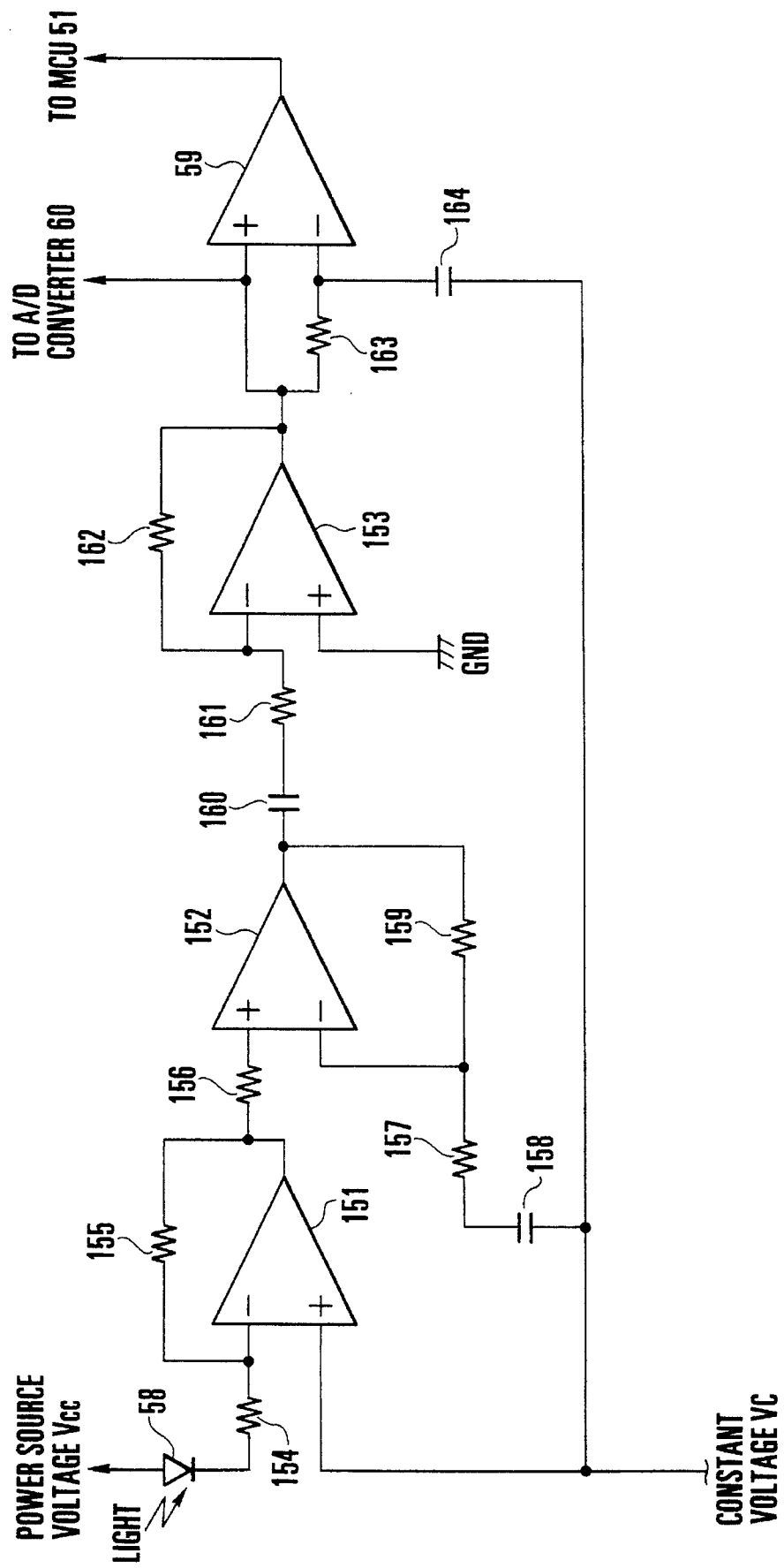
FIG. 15 is a specific circuit diagram of the remote-control-signal receiving circuit shown in FIG. 14.

FIG. 15 is a specific circuit diagram of the remote-control-signal receiving circuit 57 shown in FIG. 14.

In the remote-control-signal receiving circuit 57 shown in FIG. 15, the output of a photo-diode 58 is applied to operational amplifier 151, which has input resistor 154 and feedback resistor 155. The output of amplifier 151 is amplified by an operational amplifier 152, the DC component of the output of the operational amplifier 152 is cut by a capacitor 160, and only the thus-obtained variation component is amplified by an operational amplifier 153. A cutoff frequency f of the remote-control-signal receiving circuit 57 is selected to be $f=1/(2\pi \cdot R1 \cdot C1)$, which is determined by the product of the value of a resistor 157 (resistance value R1) and the value of a capacitor 158 (capacitance value C1), i.e., the product of the value of a resistor 159 (resistance value R2) and the value of the capacitor 160 (capacitance value C2). The values of the resistor 157 and the resistor 159 are equal to each other, and the values of the capacitor 158 and the capacitor 160 are equal to each other.

Since a predetermined frequency band of approximately 30–40 kHz is used for the frequency of a remote-control-signal carrier, C and R (capacitance value and resistance value) are selected so that the cutoff frequency f can become f=100 kHz (a frequency higher than the high-frequency limit of the aforesaid predetermined frequency band). The comparator 59 compares the remote-control-signal reception output of the operational amplifier 153 of the remote-control-signal receiving circuit 57 with an integral value of the remote-control-signal reception output. If the input signal of the comparator 59 is increasing, the comparator 59 outputs a high-level signal, while if the input signal of the comparator 59 is decreasing, the comparator 59 outputs a low-level signal. During a remote control operation, a user transmits a plurality of light pulses, which are modulated into approximately 30–40 kHz, from the remote-control-signal transmitter (not shown), and the light pulses which are received by the remote-control-signal receiving circuit 57. On the basis of the received signal pulses, the MCU 51 executes control of the camera (i.e., photographic operations, such as a start of photography, a start of light measurement and a shutter release operation).

The operation of the camera will be described below.

Figure 16:
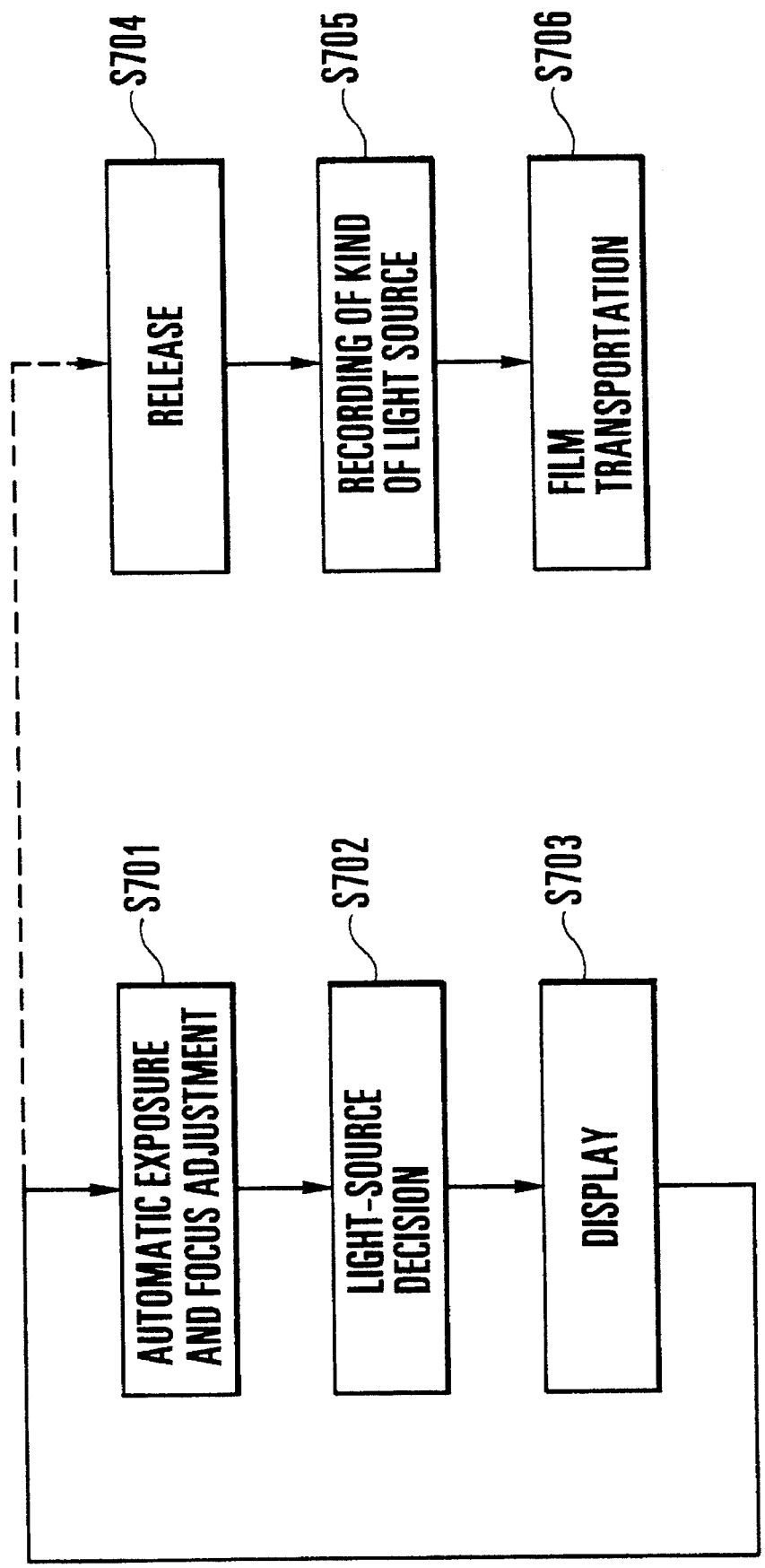
FIG. 16 is a flowchart of the entire operation of the embodiment shown in FIG. 14.

FIG. 16 is a flowchart showing the entire operation of the camera according to the embodiment shown in FIG. 14. Referring to FIG. 16, when the camera is activated, the MCU 51 receives the output of the light measuring circuit 52 and performs a computation on exposure to be controlled, as well as receives the output of the AF sensor CCD 55 and adjusts the focus of the lens (S701). Then, the MCU 51 makes a decision as to the kind of light source in accordance with a sequence which will be described later, on the basis of the output of the light measuring circuit 52 and the output of the remote-control-signal receiving circuit 57 (Step S702). The MCU 51 displays the result of the computation of a measured-light value and the like on the LCD panel 69 (Step S703).

When the camera is in operation, the above-described steps S701 to S703 are repeated until a release button (not shown) is pressed to execute a shutter release operation. If the release button is pressed, the MCU 51 controls a diaphragm and a shutter in accordance with an exposure value computed in Step S701 (S704). The data indicative of the kind of light source determined in Step S702 is recorded by the information recording circuit 68 (S705). Then, the preparatory operations required for the next photographic cycle, such as film transportation and shutter charging, are performed to complete the shutter release operation (S706).

Figure 17:
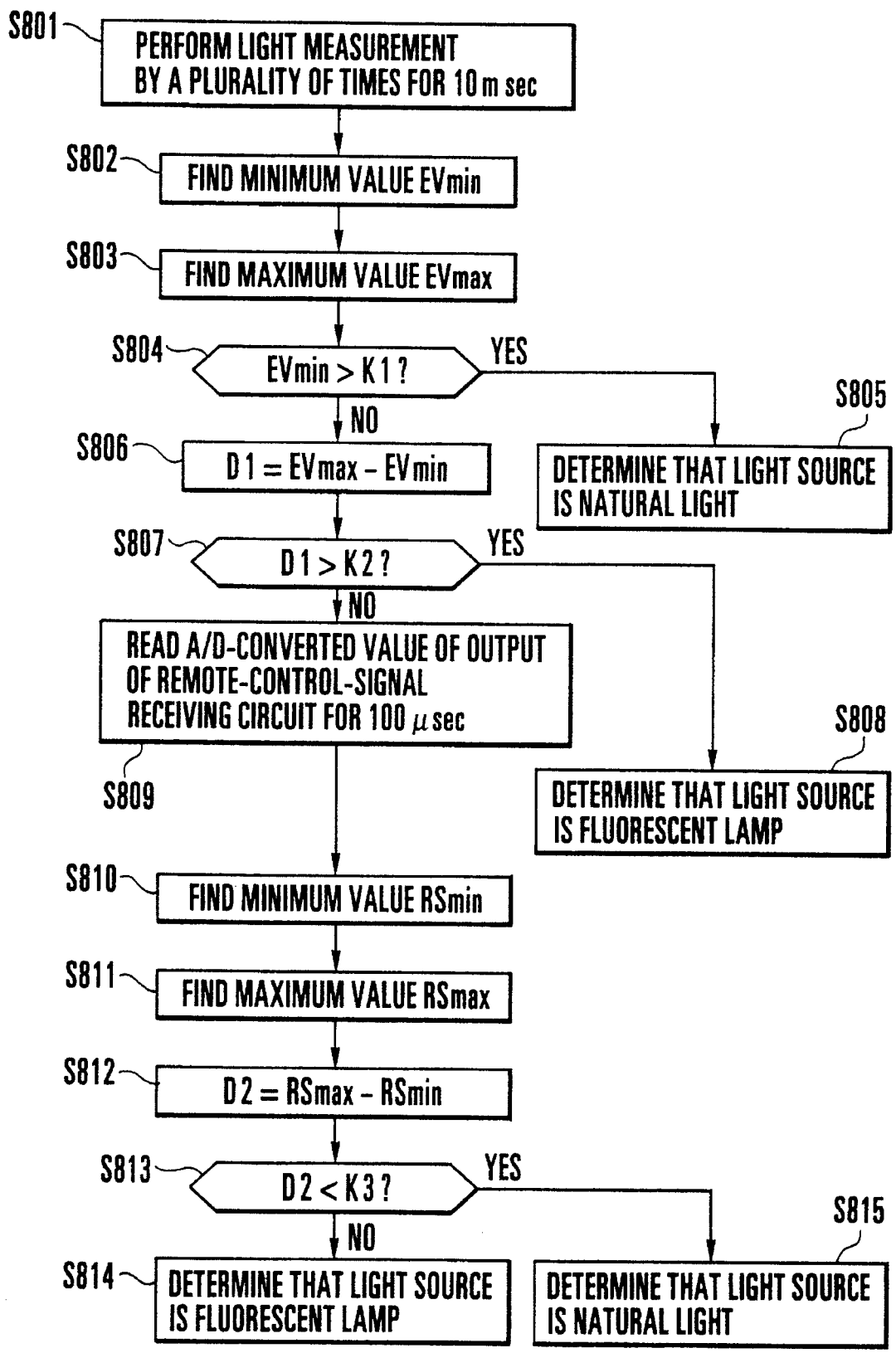
FIG. 17 is a flowchart of the light-source determining operation of the embodiment shown in FIG. 14.

A decision as to the kind of light source, which is made in the camera according to the embodiment having the above-described arrangement, will be described below with reference to the flowchart of the light-source determining operation shown in FIG. 17.

First, during a light measuring operation, the reading means 51' which operates on the MCU 51 reads the output of the light measuring circuit 52 continuously by a plurality of times for a predetermined time period of ten milliseconds (Step S801). The average value of the read values is employed as a measured-light value which determines a normal exposure control value. In the case of a mode for determining the kind of light source, the decision means 51" which operates on the MCU 51 finds a minimum value EVmin of the values read by the reading means 51' (Step S802) and then a maximum value EVmax (Step S803). The decision means 51" compares the minimum value EVmin found in Step S802 with a constant K1 (Step S804). If the result of this comparison is EVmin>K1, the decision means 51" determines that the kind of light source is natural light, and brings the light-source determining process to an end (Step S805). The constant K1 is a natural-light constant represented as a value corresponding to the extent of brightness which is normally not provided by an artificial light source.

If the result of the aforesaid comparison is EVmin≦K1, it is determined that the kind of light source is an artificial light source (Step S804), the decision means 51" finds the difference between the maximum value EVmax and the minimum value EVmin, i.e., D1=EVmax−EVmin (Step S806), and compares the obtained D1 with a constant K2 for flicker detection. If D1>K2, the decision means 51" determines that the light source has flicker (Step S807) and determines that the kind of light source is a fluorescent lamp (a first kind of light source), thus bringing the light-source determining process to an end (Step S808).

If the result of the aforesaid comparison is D1≦K2 (Step S807), this indicates that an error may have occurred in the detection of flicker as described above, particularly in the case of a high-frequency lighting fluorescent lamp because of the characteristics of a logarithmic compression circuit or the like of the light measuring circuit 52. For this reason, the reading means 51' performs the second processing of reading the A/D converted value of the output of the remote-control-signal receiving circuit 57 continuously by a plurality of times for a predetermined time period of one hundred microseconds (Step S809). In a manner similar to the case of the aforesaid measured-light value, the decision means 51" finds a minimum value RSmin of the read values (S810) and then finds a maximum value RSmax (Step S811). The decision means 51" finds the difference between the maximum value RSmax and the minimum value RSmin, i.e., D2=RSmax−RSmin (Step S812). The decision means 51" compares the obtained D2 with a constant K3 for detection of high-frequency flicker, and, if D2<K3, determines that the light source has no flicker (S813) and determines that the light source is natural light (S815). If D2≧K3, the decision means 51" determines that high-frequency flicker is present (S813), and determines that the light source is a fluorescent lamp (S814).

As described previously, the remote-control-signal receiving circuit 57 is arranged to detect a signal of 30–40 kHz and is suited to detect the flicker of a high-frequency lighting fluorescent lamp. Accordingly, owing to the above-described two-step processing using the light measuring circuit 52 and the output of the remote-control-signal receiving circuit 57, it is possible to accurately determine the kind of light source even if the light source is a normal fluorescent lamp or a high-frequency lighting fluorescent lamp.

In the above-described steps S801–S803, S806, S807 and S810–S813, if the difference between the maximum value and the minimum value of the values read by the reading means is greater than a predetermined value, it is determined that flicker is present. However, in the case of a fluorescent lamp or the like, since a frequency signal (AC signal) is obtained, whether flicker is present may be determined by comparing a signal according to the amplitude of a signal read by the reading means with a predetermined value.

Another embodiment of the present invention will be described below. This embodiment is intended to provide a camera capable of determining the kind of light source by means of a remote-control-signal receiving circuit the arrangement of which is switchable for adaptation to flicker detection.

The remote-control-signal receiving circuit 57, which is arranged to detect a signal of 30–40 kHz as described previously, is not suited to detect the flicker of a normal fluorescent lamp which has a flicker frequency of as low as approximately 100 Hz.

FIG. 18 is a specific circuit diagram showing a second remote-control-signal receiving circuit. In FIG. 18, identical reference numerals are used to denote elements identical to the corresponding elements used in the first remote-control-signal receiving circuit 57 shown in FIG. 15. In FIG. 18, capacitors 165 and 167 are connected in parallel to capacitors 158 and 160 via MOS switches 166 and 168, respectively.

The MOS switches 166 and 168 are connected to a port of the MCU 51, and are controlled by the MCU 51 in the light-source determining mode thereof. The time constants of the capacitance values of the respective capacitors 165 and 167 are determined so that the cutoff frequency f of a remote-control-signal receiving circuit can be made 300 Hz. If such a circuit is used for receiving a remote control signal, the MCU 51 turns off the MOS switches 166 and 168 to return the cutoff frequency f to 100 kHz, thereby enabling reception of the remote control signal. If the circuit is used for detecting a low-frequency flicker of a light source, the MCU 51 turns on the MOS switches 166 and 168 to lower the cutoff frequency f to 300 Hz, thereby enabling detection of the flicker of a normal fluorescent lamp.

An algorithm for determining the kind of light source is arranged as follows. Similarly to the flowchart shown in FIG. 17, the reading means 51' reads the output of a remote-control-signal receiving circuit having the cutoff frequency f=300 Hz, continuously by a plurality of times for a predetermined time period of ten milliseconds. The decision means 51" finds a difference D3 between the maximum value and the minimum value of the read values. If D3>K2, the decision means 51" determines that the light source is a fluorescent lamp; otherwise, it is determined that the light source is natural light. Subsequently, the cutoff frequency f may be returned to 100 kHz and Step S809 of FIG. 17 may be additionally executed for the purpose of confirmation.

As described above, even if the circuit used in a sensor is not suited to flicker detection, the sensor can be used for flicker detection by switching its circuit constants and switching the characteristics of the pass frequency band. Accordingly, it is possible to accurately determine the kind of light source even in an arrangement having no circuit suited for flicker detection.

Another embodiment of the present invention for determining the kind of light source from the output of the flash-light adjusting sensor 61 will be described below.

The flash-light adjusting sensor 61, which is arranged to detect light reflected from a film surface, is not capable of detecting light incident from a subject in its normal state unlike the AE (light measuring) sensor 53. For this reason, a shutter curtain having an increased reflectance is adopted so that even if the film surface is not exposed, light can be made incident on the flash-light adjusting sensor 61 when the camera is in its mirror-up state.

Figure 19:
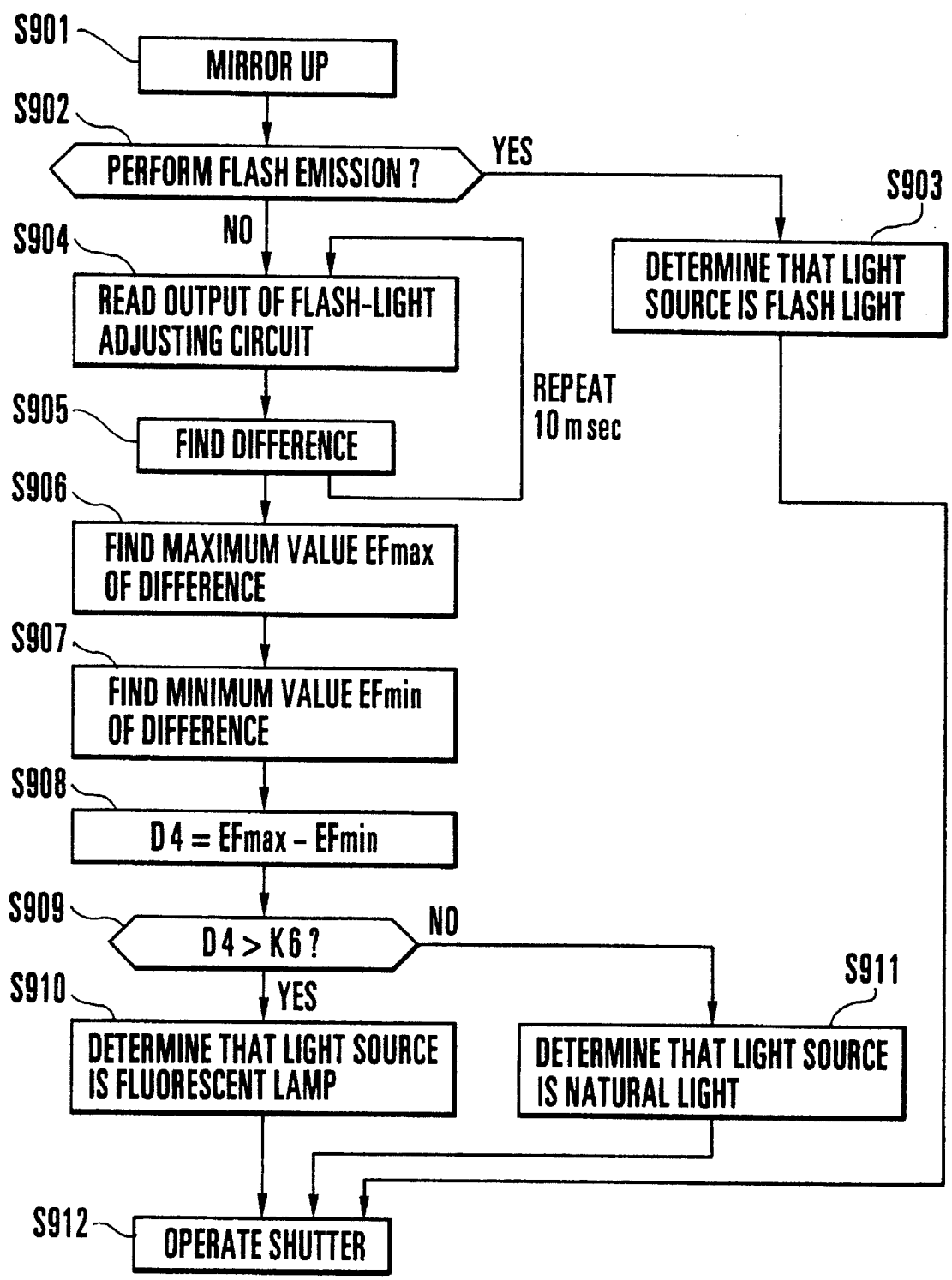
FIG. 19 is a flowchart of a light-source determining operation according to another embodiment of the present invention.
Figure 20A:
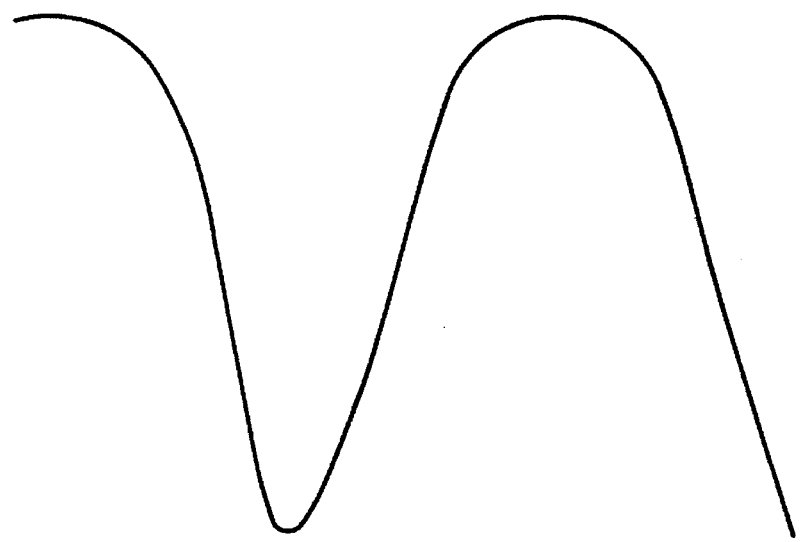
FIGS. 20(A), 20(B) and 20(C) are views showing luminance waveforms of different kinds of light sources.
Figure 20B:
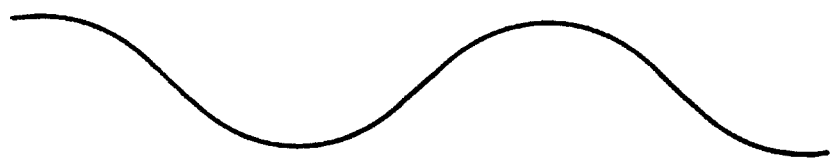
Figure 20C:
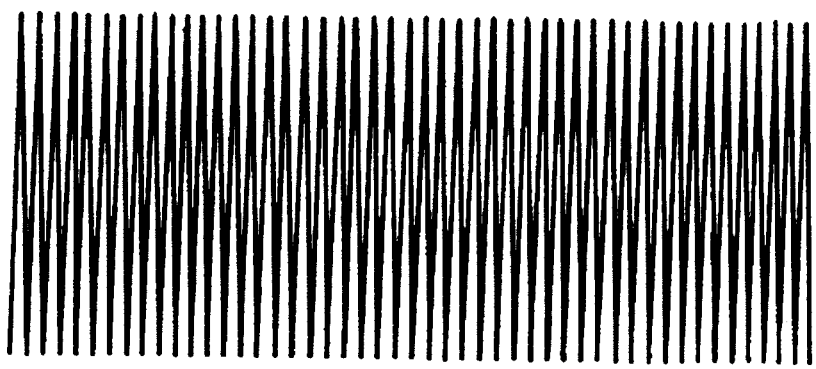

The operation of determining the kind of light source during a shutter release sequence will be described below with reference to the flowchart of the light-source determining operation shown in FIG. 19.

First, a mirror-up operation is performed to enable subject light to be incident on the flash-light adjusting sensor 61 (S901). Then, it is determined whether flash photography is to be performed (S902). If flash photography is to be performed, it is determined that the kind of light source is flash light, and a normal release operation is performed (S903). If no flash photography is to be performed, a decision is made as to the kind of light source. The reading means 51' reads a digital value from the A/D converter 64 at intervals of a predetermined time period (S904). Since this value is a value obtained by integrating the amount of incident light by means of the capacitor (integrating circuit) 66, the difference between the current read data and the previous read data is obtained to find the amount of subject light per unit time (S905). Steps S904 and S905 are repeated for a predetermined time period of ten milliseconds.

The decision means 51" finds a maximum value EFmax of the thus-read difference value (S906) and then a minimum value EFmin thereof (S907). The difference between the maximum value EFmax and the minimum value EFmin, i.e., D4=EFmax−EFmin is obtained (S908). The decision means 51" compares the difference D4 with a constant K6 (S909). If D4>K6, the decision means 51" determines that the light source is a fluorescent lamp (S910), whereas if D4≦K6, the decision means 51" determines that the light source is natural light (S911). After the completion of the decision as to the kind of light source, the shutter is driven to perform a shutter release operation (S912).

In the above-described manner, it is possible to accurately determine the kind of light source by means of a more quantitative decision.

Another embodiment for determining the kind of light source on the basis of the output of the CCD 55 for AF will be described below.

A line sensor, such as a CCD, which is used as the CCD 55 for AF, normally does not have a logarithmic compression circuit and is capable of responding to even a signal having a comparatively high frequency. Accordingly, it is possible to accurately determine a high-frequency lighting fluorescent lamp by controlling the CCD to keep its accumulation time constant, causing the reading means 51' to read the output of the sensor 55 at intervals of as short a time period as possible, and causing the decision means 51" to determine the kind of light source by finding the amount of variation, as by the above-described algorithm.

A decision as to a tungsten lamp will be described below. Since the flicker of a tungsten lamp does not have large amounts of high-frequency components, the decision is made by using the algorithm shown in FIG. 17 in accordance with the following relation:

$$K4<D1<K2$$

$$D2<K5$$

As can be seen from the above relation, it is possible to determine that the light source is a tungsten lamp, if D1 is smaller than the constant K2 used for determining the amount of flicker of a fluorescent lamp, larger than the constant K4 used for determining the amount of flicker of tungsten light, and smaller than the constant K5 used for determining whether a light source is a tungsten lamp.

The above-described embodiment employs the light-source determining algorithm of finding the difference between the maximum value and the minimum value of the read values and comparing the difference value with the constant. However, it is of course possible to employ another algorithm which enables to make a similar decision. For example, it is also possible to find the sum of the absolute values of the differences of measured-light values and make a decision on the basis of the sum.

In the above-described embodiment, information indicative of the kind of light source is recorded at the time of a release operation. However, each time a decision is made, such information may be repeatedly recorded in one of recording areas corresponding to individual frames. In the case of an arrangement which uses magnetic information provided on a film, such information may be recorded during film transportation after a release operation, or may be temporarily stored in a memory and collectively recorded during rewinding.

In the above description, reference has been made to a decision as to the outputs of the light measuring sensor 53 and the remote-control-signal sensor 58, a decision as to the output of the remote-control-signal sensor 58 alone, a decision using the flash-light adjusting sensor 61, and a decision using the AF sensor 55. However, these sensors may be appropriately combined so that a final decision can be made as to the kind of light source. If these sensor circuits are formed as an IC, it is possible to provide a camera which is improved in terms of space, cost and function.

What is claimed is:

1. A camera comprising:
   (a) a light measuring circuit which measures a light measuring value for exposure control;
   (b) a light receiving circuit different from the light measuring circuit;
   (c) a first processing circuit for processing an output of said light receiving circuit for implementing a predetermined function of said camera; and
   (d) a second processing circuit for determining a kind of light source of light received by said light receiving circuit on the basis of the output of said light receiving circuit.

2. A camera according to claim 1, wherein said camera includes remote control circuitry and wherein said light receiving circuit is a light receiving circuit for said remote control circuitry and is adapted to receive a light signal for remote control.

3. A camera according to claim 1, wherein said camera includes autofocus circuitry and wherein said light receiving circuit is a light-receiving sensor circuit for said autofocus circuitry.

4. A camera according to claim 1, wherein said camera includes flash unit and wherein said light receiving circuit is a light-receiving sensor circuit for controlling an amount of flash emission and is adapted to receive light reflected from a subject after being emitted from said flash unit.

5. A camera according to claim 1, wherein said second processing circuit determines the kind of light source according to an amplitude of the output of said light receiving circuit or a difference between a maximum value and a minimum value of the output of said light receiving circuit.

6. A camera according to claim 1, wherein said second processing circuit determines the kind of light source on the basis of the output of said light measuring circuit and the output of said light receiving circuit.

7. A camera according to claim 6, wherein said camera includes remote control circuitry and wherein said light receiving circuit is a light receiving circuit for said remote control circuitry and is adapted to receive a light signal for remote control.

8. A camera according to claim 4, wherein said second processing circuit includes integrating means for integrating an output of said light-receiving sensor circuit and computing means for finding an amount of variation per unit time in an integral value provided by said integrating means, said second processing circuit determining the kind of light source according to a difference between a maximum amount of variation and a minimum amount of variation from among amounts of variations obtained by said computing means.

9. A camera having a remote control circuit which receives a light signal for remote control, comprising:

(a) a light receiving circuit for receiving the light signal;

(b) switching means for switching a light receiving characteristic of said light receiving circuit between a first characteristic which allows said light receiving circuit to pass a frequency contained in a first frequency band and a second characteristic which allows said light receiving circuit to pass a frequency contained in a second frequency band;

(c) a remote control processing circuit for performing a remote control function according to an output which is provided by said light receiving circuit when the light receiving characteristic of said light receiving circuit is switched to the first characteristic; and (d) a decision circuit for determining the kind of light source on the basis of the output which is provided by said light receiving circuit when the light receiving characteristic of said light receiving circuit is switched to the first characteristic and an output which is provided by said light receiving circuit when the light receiving characteristic of said light receiving circuit is switched to the second characteristic.

* * * * *

UNITED STATES PATENT AND TRADEMARK OFFICE
CERTIFICATE OF CORRECTION

PATENT NO. : 5,621,494
DATED : April 15, 1997
INVENTOR(S) : Kazumi et al.

It is certified that error appears in the above-identified patent and that said Letters Patent are hereby corrected as shown below:

Col. 11, line 44, delete "BY(n)" and insert -- BV(n) --.

Col. 12, line 8, delete "BY(n)" and insert -- BV(n) --.

Signed and Sealed this

Thirtieth Day of June, 1998

Attest:

BRUCE LEHMAN

Attesting Officer     Commissioner of Patents and Trademarks